(12) United States Patent
Berg

(10) Patent No.: US 6,755,271 B1
(45) Date of Patent: Jun. 29, 2004

(54) SNOWMOBILE DRIVETRAIN

(75) Inventor: Norman O. Berg, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 11 days.

(21) Appl. No.: 10/137,970

(22) Filed: May 3, 2002

Related U.S. Application Data

(60) Provisional application No. 60/318,151, filed on Sep. 7, 2001, and provisional application No. 60/317,892, filed on Sep. 7, 2001.

(51) Int. Cl.[7] .............................................. B62M 27/02
(52) U.S. Cl. ...................................... 180/190; 180/193
(58) Field of Search ................................ 180/190, 191, 180/192, 193, 9.25, 9.1, 9.5

(56) References Cited

U.S. PATENT DOCUMENTS

| | | |
|---|---|---|
| 3,474,751 A | 10/1969 | Hebert |
| 3,521,718 A * | 7/1970 | Masaoka .................... 180/9.64 |
| 3,590,523 A * | 7/1971 | Riesgraf ..................... 446/433 |
| 3,698,497 A | 10/1972 | Bombardier |
| 3,758,169 A * | 9/1973 | Trapp .......................... 305/154 |
| 3,776,354 A | 12/1973 | Duclo et al. |
| 3,850,050 A | 11/1974 | Lemmens |
| 3,908,483 A | 9/1975 | Piquette |
| 3,963,083 A | 6/1976 | Reese |
| 3,981,373 A | 9/1976 | Irvine |
| 4,008,777 A | 2/1977 | Juto et al. |
| 4,301,884 A * | 11/1981 | Taylor ......................... 180/190 |
| 4,362,524 A * | 12/1982 | Lob et al. ..................... 474/88 |
| 4,489,801 A | 12/1984 | Marier |
| 4,502,353 A | 3/1985 | Beaudoin |
| 4,633,964 A | 1/1987 | Boyer et al. |
| 4,699,234 A | 10/1987 | Shinozaki et al. |
| 4,779,695 A | 10/1988 | Yasui |
| D314,535 S | 2/1991 | Matsue |
| 5,172,786 A | 12/1992 | Ishibashi et al. |
| 5,344,370 A | 9/1994 | Luyckx |
| 5,454,443 A | 10/1995 | Fischle et al. |
| 5,474,146 A | 12/1995 | Yoshioka et al. |
| 5,586,614 A | 12/1996 | Kouchi et al. |
| 5,660,245 A | 8/1997 | Marier et al. |
| 5,685,387 A | 11/1997 | Rioux et al. |
| 5,797,778 A | 8/1998 | Ito et al. |
| 6,155,371 A | 12/2000 | Izumi |
| 6,170,589 B1 | 1/2001 | Kawano et al. |
| D438,821 S | 3/2001 | Cadotte et al. |
| 6,234,263 B1 | 5/2001 | Boivin et al. |
| 6,263,991 B1 | 7/2001 | Savage et al. |
| 6,357,543 B1 | 3/2002 | Karpik |
| 2001/0001995 A1 | 5/2001 | Izumi et al. |
| 2001/0032745 A1 | 10/2001 | Schoenfelder |
| 2001/0040063 A1 | 11/2001 | Wubbolts et al. |
| 2001/0040064 A1 | 11/2001 | Girouard et al. |
| 2001/0047900 A1 | 12/2001 | Fecteau et al. |
| 2002/0000340 A1 | 1/2002 | Laimbock |
| 2002/0029920 A1 | 3/2002 | Fournier et al. |

FOREIGN PATENT DOCUMENTS

| | | | | |
|---|---|---|---|---|
| JP | 403231090 A | * 10/1991 | ................. | 180/190 |
| JP | 1999/287531 | 4/1997 | | |
| JP | 2000/35221 | 12/2000 | | |
| JP | 2001/65344 | 3/2001 | | |

* cited by examiner

*Primary Examiner*—Daniel G. DePumpo
(74) *Attorney, Agent, or Firm*—Allen W. Groenke; Fredrikson & Byron, P.A.

(57) ABSTRACT

Methods and apparatus for propelling snowmobiles are disclosed. A snowmobile in accordance with an exemplary embodiment of the present invention comprises a chassis defining a tunnel, a drive shaft at least partially disposed in the tunnel, and at least one drive sprocket fixed to the drive shaft. A drive track overlays a portion of the at least one drive sprocket. A bearing is disposed within an interior of the drive track for rotatably supporting the drive shaft. The drive shaft is preferably operatively coupled to an engine by a drivetrain. In an advantageous embodiment, the drivetrain comprising a reduction mechanism that is substantially disposed within the tunnel defined by the chassis. In a particularly advantageous embodiment, the reduction mechanism is disposed within a projection extending from a drive sprocket fixed to the drive shaft.

20 Claims, 20 Drawing Sheets

SNOWMOBILE DRIVETRAIN

RELATED APPLICATIONS

This application is related to and claims priority to U.S. Provisional Application No. 60/318,151, filed Sep. 7, 2001, and entitled Snowmobile Drivetrain.

This application is also related to and claims priority to U.S. Provisional Application No. 60/317,892, filed Sep. 7, 2001, and entitled Snowmobile Providing an Enhanced Riding Experience.

The entire disclosure of the fore mentioned applications is hereby incorporated by reference.

FIELD OF THE INVENTION

The present invention relates generally to snowmobiles. More particularly, the present invention relates to methods and apparatus for propelling snowmobiles.

BACKGROUND OF THE INVENTION

Since their development in the middle of the $20^{th}$ century, snowmobiles have gained widespread popularity. Snowmobiles are commonly used for trail riding and utility applications. Perhaps the most common snowmobile application is recreational trail riding. Trail riding on a snowmobile allows a snowmobile enthusiast to travel through areas which are not accessible by other types of vehicles. For example, snowmobiles can travel very rapidly across frozen lakes during the winter in northern climates. Modern snowmobiles, can cover ground very rapidly and can cover great distances. Frequently, snowmobile enthusiasts ride their snowmobile for many hours straight and cover many miles.

A rider operates a snowmobile by providing inputs such as acceleration inputs provided using a throttle, deceleration inputs provided using a brake, and steering inputs provided using a set of handle bars. The rider may also influence the performance of the machine by shifting his or her weight, for example, by leaning into a turn.

Frequently, people become interested in snowmobiling because of the unique riding experience that snowmobiles provide. Part of the thrill of riding a snowmobile is encountering challenging terrain, and traversing that terrain through a combination of the skill of the rider and the way that the snowmobile reacts to the inputs provided by the rider. Aspects of a snowmobile such as the overall weight of the snowmobile, the weight distribution of the snowmobile, and the location of the snowmobile center of gravity all effect the riding experience enjoyed by a snowmobiling enthusiast.

The ability of a rider to traverse challenging terrain smoothly and quickly frequently depends upon the way that the snowmobile responds to the rider. As mentioned previously, the rider can control the snowmobile by providing inputs using the handlebars, brake and throttle. The rider can also control the snowmobile by selectively shifting his or her weight.

The way that a particular snowmobile responds to inputs provided by a rider may depend upon the snowmobile's total inertia, the snowmobile's moment of inertia, and the location of the snowmobile's center of gravity. The total inertia of a snowmobile has an effect on that snowmobile's performance because this total inertia determines the extent to which the snowmobile will resist changes in location and linear velocity. For example, the inertia of an overly heavy snowmobile may limit how rapidly that snowmobile can accelerate and decelerate. The moment of inertia of a snowmobile also has an effect on that snowmobile's performance, since it determines the extent to which the snowmobile will resists changes in angular position and rotational velocity. The moment of inertia of a snowmobile is determine, at least in part by the total mass of the snowmobile the way in which that mass is distributed.

SUMMARY OF THE INVENTION

The present invention relates generally to snowmobiles. More particularly, the present invention relates to methods and apparatus for propelling snowmobiles. A snowmobile in accordance with an illustrative implementation of the present invention comprises a chassis defining a tunnel, a drive shaft at least partially disposed in the tunnel, and at least one drive sprocket fixed to the drive shaft. A drive track overlays a portion of the at least one drive sprocket, and an inner surface of the drive track defines an interior of the drive track.

In one aspect of the present invention, a bearing is disposed within the interior of the drive track for rotatably supporting the drive shaft. In some implementations of the present invention, the bearing is supported by a housing having a first portion fixed to the chassis and a second portion extending into the interior of the drive track. The housing may be selectively fixed to the chassis, for example, by a plurality of threaded fasteners.

The drive shaft is preferably operatively coupled to an engine by a drivetrain. In one advantageous implementation, the drivetrain comprises a reduction mechanism that is substantially disposed within the tunnel defined by the chassis. In a particularly advantageous implementation, the reduction mechanism is disposed within a projection extending from a drive sprocket fixed to the drive shaft.

In one illustrative implementation of the present invention, the speed reduction mechanism includes a first gear fixed to the drive shaft and a second gear engaging the first gear so that a plurality of teeth of the second gear are intermeshed with a plurality of teeth of the first gear. The first gear advantageously has a first pitch circle that is different from a second pitch circle of the second gear. The first pitch circle and the second pitch circle may be advantageously selected to provide a desired gear ratio. In certain implementations, the first gear comprises a ring gear and the second gear comprises a spur gear disposed within a cavity defined by the ring gear. In certain implementations, both the first gear and the second gear are disposed within a cavity defined a housing.

In one aspect of the present invention, the speed reduction mechanism is disposed below a reference plane defined by a top surface of the drive track. Placing the speed reduction mechanism in a relatively low position may serve to lower the center of gravity of a snowmobile including the speed reduction mechanism. A snowmobile with a lower center of gravity may be more stable and is less likely to overturn.

In an additional aspect of the present invention, a speed reduction mechanism having a compact shape is provided. In certain advantageous implementations, the compact shape of the speed reduction mechanism allows the speed reduction mechanism to be disposed within an interior defined by the inner surface of the drive track. In certain particularly advantageous implementations, the compact shape of the speed reduction mechanism allows the speed reduction mechanism to be disposed within a projection extending from a drive sprocket coupled to the speed reduction mechanism by a drive shaft. Providing a speed reduction mechanism having a compact arrangement, and positioning this speed reduction mechanism in a central location of a snowmobile may serve to provide a snowmobile having a reduced moment of inertia. When a snowmobile has a reduced moment of inertia the rider can more easily make quick changes in the angular orientation and rotational velocity of the snowmobile.

In yet another aspect of the present invention, a speed reduction mechanism may be provided which has less rotating mass than other types of speed reduction mechanisms. Providing a speed reduction mechanism with a lower rotating mass serves to provide a snowmobile having quicker acceleration. Quick acceleration may be advantageous in high performance applications such as snowmobile racing.

In still another aspect of the present invention, a method for easily changing the gear ratio of a speed reduction mechanism is provided. This method allows a rider to change the gear ratio to tune the snowmobile for a particular set of riding conditions. A method of changing a gear ratio of a drivetrain in accordance with the present invention may comprise the steps of 1) providing a speed reduction mechanism including a ring gear fixed to a drive shaft, 2) providing an original assembly fixed to the speed reduction mechanism, the original assembly including an original drive gear rotatably supported by an original mounting plate, 3) providing a new assembly including a new drive gear rotatably supported by a new mounting plate, the new drive gear having an effective diameter different than an effective diameter of the original drive gear, 4) removing the original assembly from the speed reduction mechanism, and 5) installing the new assembly onto the speed reduction mechanism.

DETAILED DESCRIPTION

The following detailed description should be read with reference to the drawings, in which like elements in different drawings are numbered identically. The drawings, which are not necessarily to scale, depict selected embodiments and are not intended to limit the scope of the invention. Examples of constructions, materials, dimensions, and manufacturing processes are provided for selected elements. All other elements employ that which is known to those of skill in the field of the invention. Those skilled in the art will recognize that many of the examples provided have suitable alternatives that can be utilized.

Figure 1:
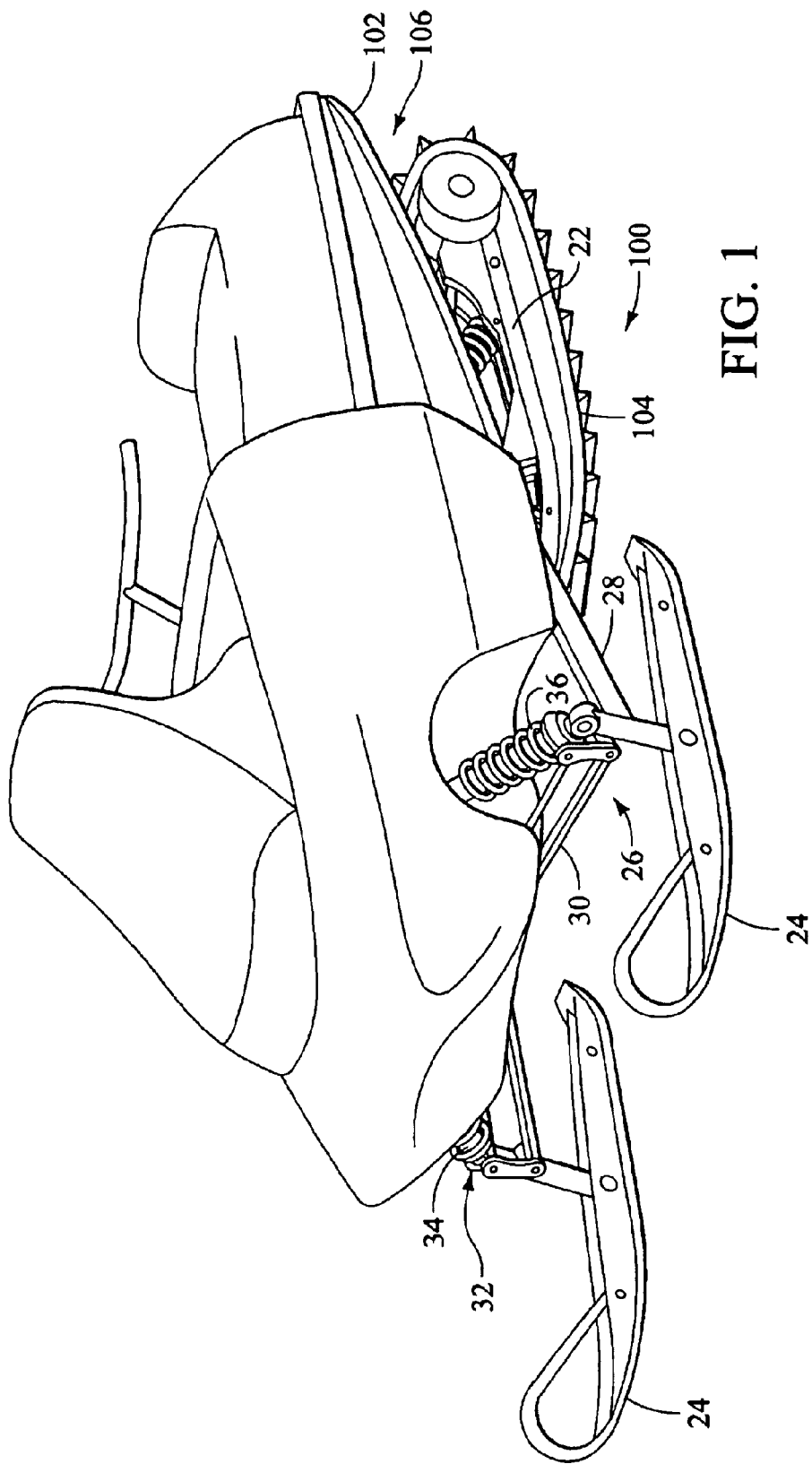
FIG. 1 is a perspective view of a snowmobile in accordance with an exemplary embodiment of the present invention.

FIG. 1 is a perspective view of a snowmobile 100 in accordance with an exemplary embodiment of the present invention. Snowmobile 100 has a chassis 102 defining a tunnel 106. In the embodiment of FIG. 1, a drive track 104 can be seen extending from tunnel 106. In the embodiment of FIG. 1, drive track 104 comprises an endless loop that is supported by a rear suspension 22. In a preferred embodiment, drive track 104 is operatively coupled to an engine by a drivetrain so that drive track 104 may be used to propel snowmobile 100.

In FIG. 1, it may also be appreciated that snowmobile 100 includes a plurality of skis 24. Each ski 24 is supported by a front suspension 26. In the embodiment of FIG. 1, each front suspension 26 includes a trailing arm 28 and a plurality of radius rods 30. Each front suspension 26 also includes a spring assembly 32. In the embodiment of FIG. 1, each spring assembly 32 includes a shock absorber 34 and a spring 36 that is disposed about shock absorber 34.

Figure 2:
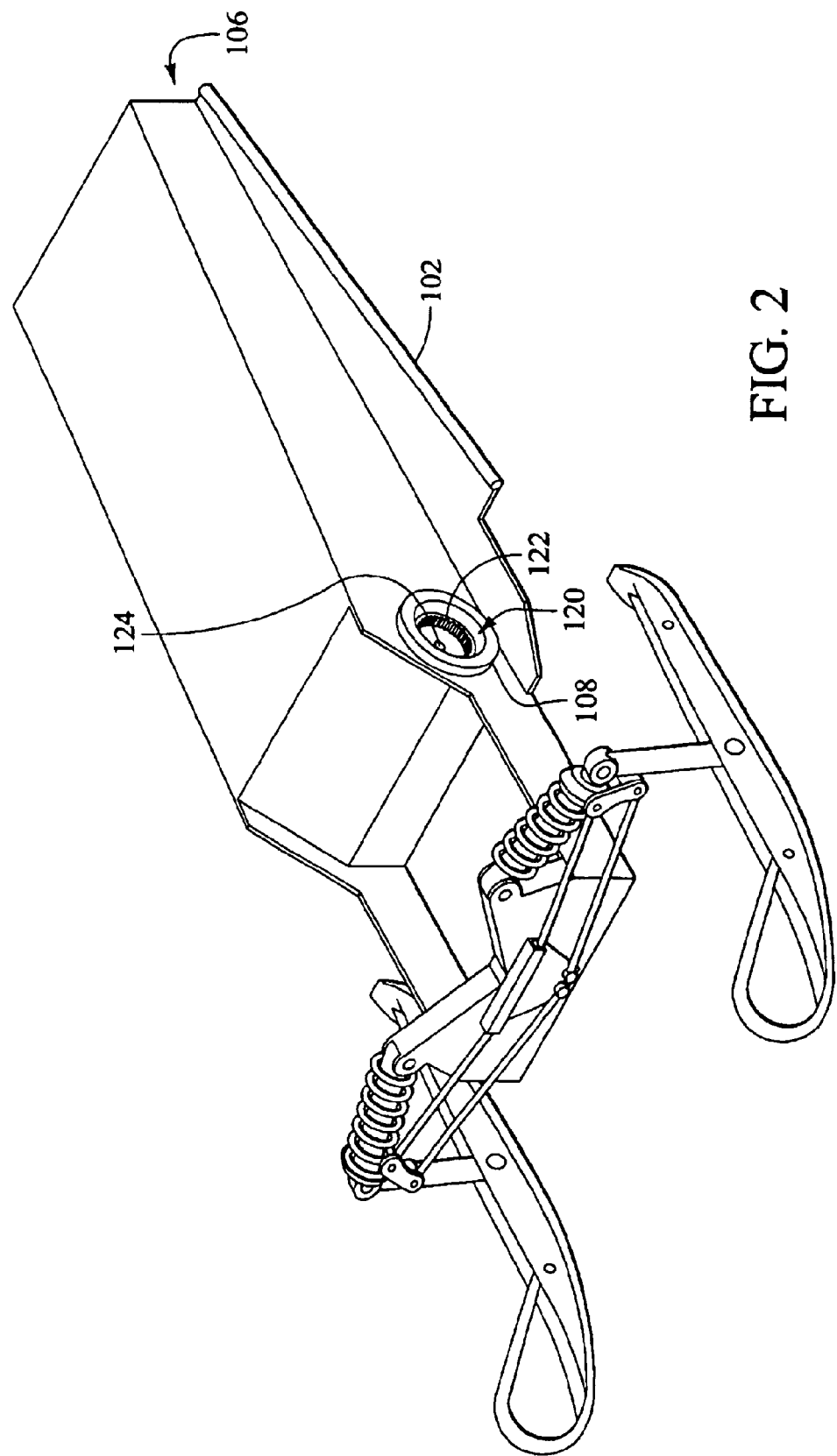
FIG. 2 is a perspective view of a snowmobile chassis assembly in accordance with an exemplary embodiment of the present invention.

FIG. 2 is a perspective view of a snowmobile chassis assembly in accordance with an exemplary embodiment of the present invention. The assembly of FIG. 2 includes a chassis 102 defining a tunnel 106 which is preferably dimensioned to receive a drive track. A housing 108 defining an chamber 120 is fixed to chassis 102 in the embodiment of FIG. 2. In FIG. 2, a ring gear 122 may be seen disposed within the chamber 120 of housing 108. Ring gear 122 is preferably fixed to a drive shaft 124. Drive shaft 124 may be used to drive a drive track.

Figure 3:
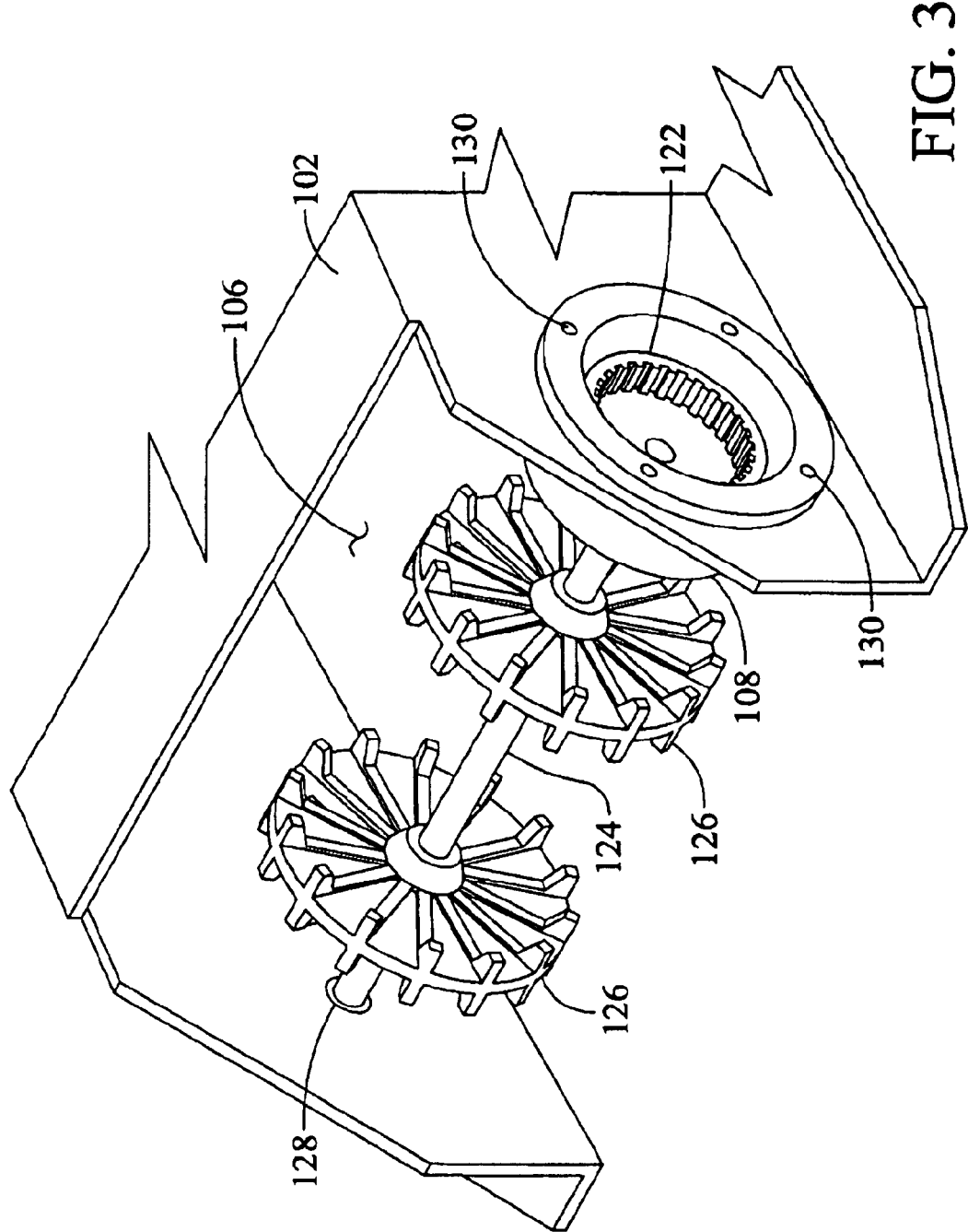
FIG. 3 is an enlarged, perspective view illustrating a portion of the chassis assembly of the previous figure.

FIG. 3 is an enlarged, perspective view illustrating a portion of the chassis assembly of the previous figure. In FIG. 3, housing 108 can be seen extending into tunnel 106 defined by chassis 102. Also in FIG. 3, it may be appreciated that a plurality of drive sprockets 126 are fixed to drive shaft 124. A bearing 128 is shown disposed about drive shaft 124 proximate one end thereof. Bearing 128 preferably rotatably supports drive shaft 124. Bearing 128 may be supported by a flange that is selectively fixed to the opposite side of chassis 102.

In FIG. 3, it may be appreciated that ring gear 122 is substantially disposed within tunnel 106 defined by chassis 102. Also with reference to FIG. 3, it may be appreciated that housing 108 extends into tunnel 106 and at least partially surrounds ring gear 122. In a preferred embodiment, housing 108 holds a bearing which rotatably supports drive shaft 124. In the embodiment of FIG. 3 housing 108 is selectively fixed to chassis 102 by a plurality of threaded fasteners 130.

Figure 4:
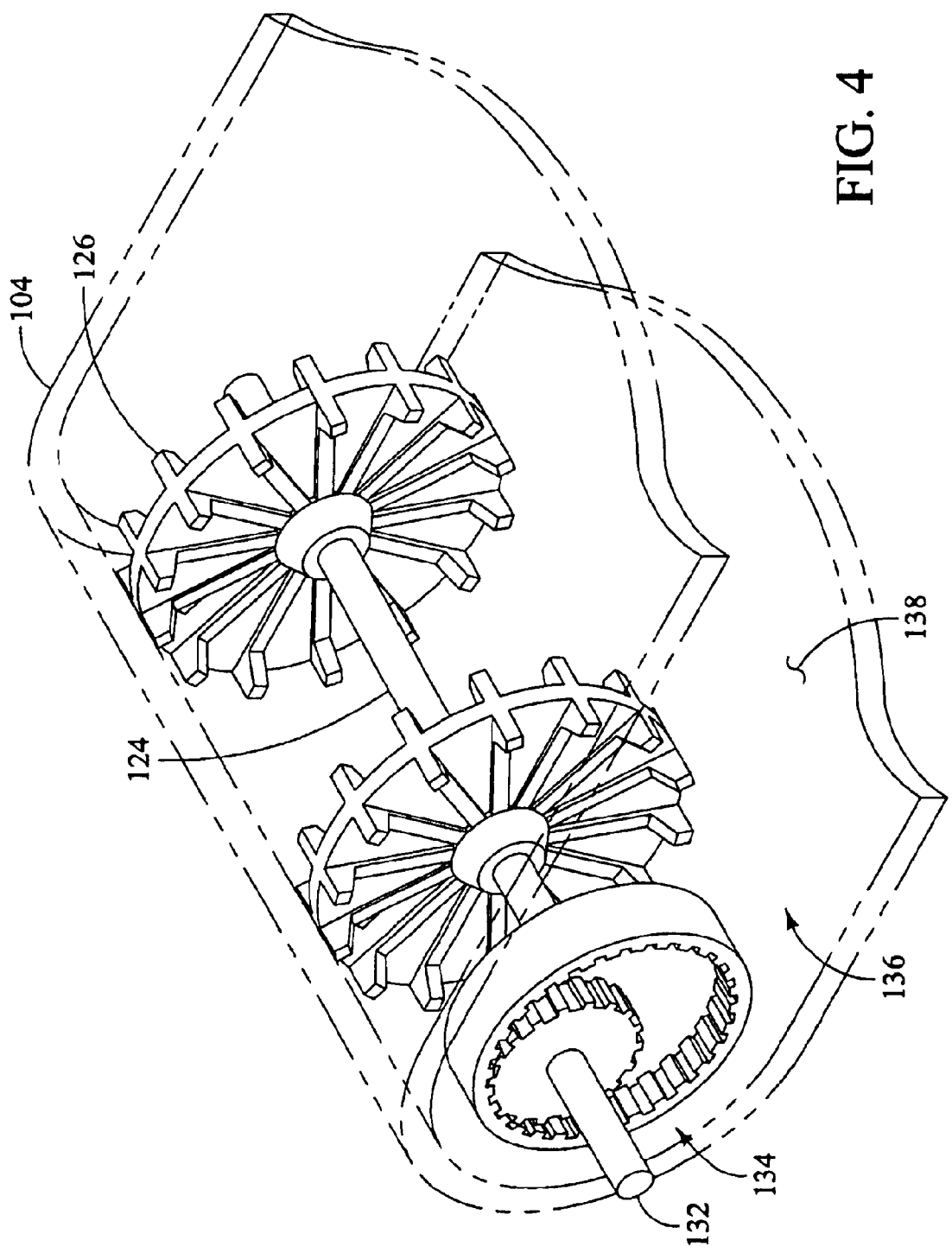
FIG. 4 is a perspective view of a drive assembly in accordance with an exemplary embodiment of the present invention.

FIG. 4 is a perspective view of a drive assembly in accordance with an exemplary embodiment of the present invention. The drive assembly of FIG. 4 may be used, for example, to propel a snowmobile such as the one illustrated in FIG. 1. In FIG. 4, the drive assembly includes a drive track 104 which is illustrated using phantom lines in FIG. 4. Drive track 104 may be driven by two drive sprockets 126 which are fixed to a drive shaft 124. The drive assembly also includes an input shaft 132. In the embodiment of FIG. 4, input shaft 132 and drive shaft 124 are coupled to one another by a speed reduction mechanism 134. In a preferred embodiment, speed reduction mechanism 134 is configured to provide a desired reduction in rotational velocity.

In FIG. 4 it may be appreciated that speed reduction mechanism 134 has a compact arrangement allowing it to fit within an interior 136 defined by an inner surface 138 of drive track 104. Providing a speed reduction mechanism having a compact arrangement, and positioning this speed reduction mechanism in a central location of a snowmobile may serve to provide a snowmobile having a reduced moment of inertia. When a snowmobile has a reduced moment of inertia, the rider may be able to change the angular orientation and angular velocity of the snowmobile more quickly.

Figure 5:
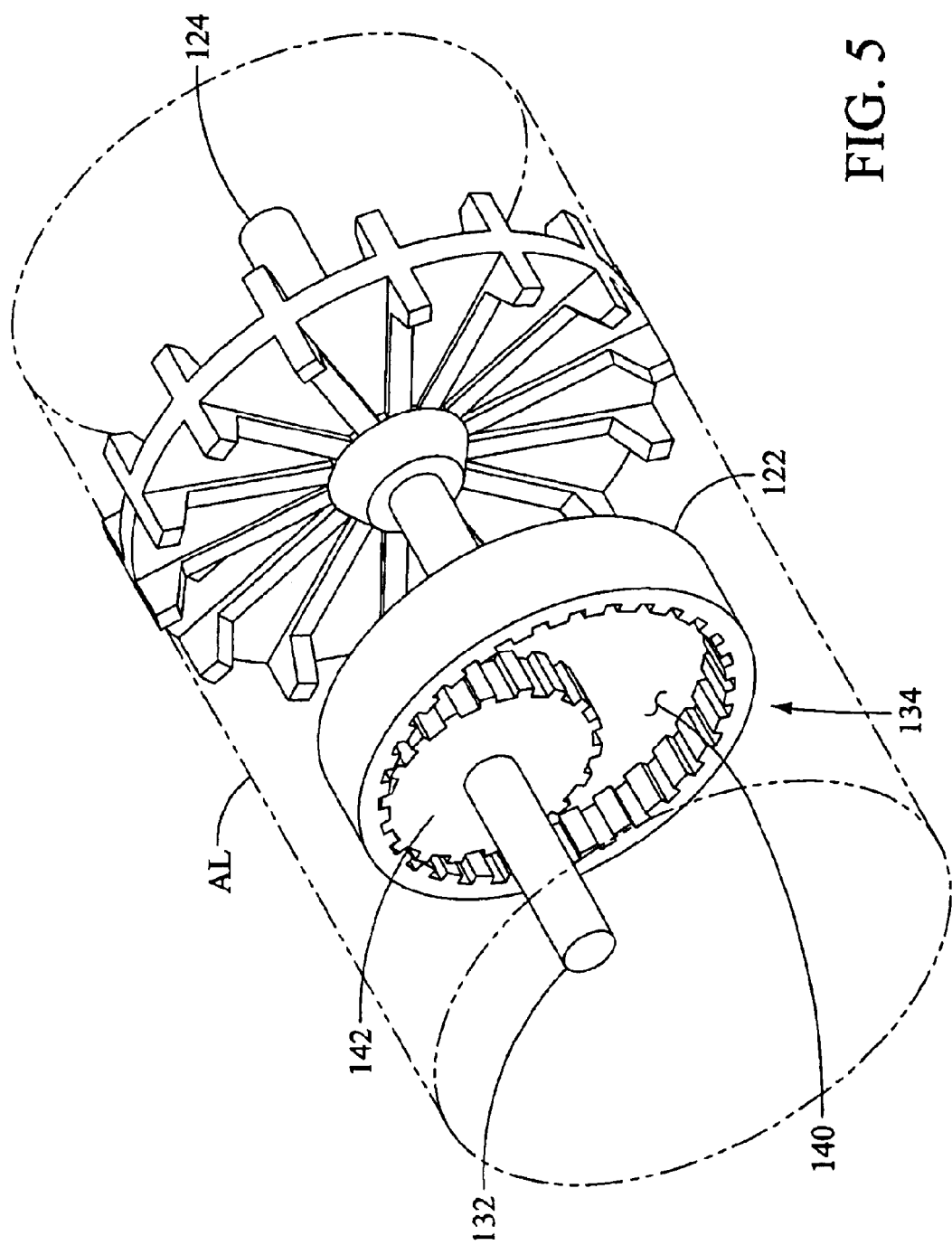
FIG. 5 is an enlarged perspective view illustrating a portion of the drive assembly of FIG. 4.

FIG. 5 is an enlarged perspective view illustrating a portion of the drive assembly of FIG. 4. In FIG. 5 it may be appreciated that speed reduction mechanism 134 includes a ring gear 122 defining a cavity 140 and a drive gear 142 disposed in cavity 140. In FIG. 5, ring gear 122 is shown fixed to drive shaft 124. Ring gear 122 has internal teeth which intermesh with the external teeth of drive gear 142. Drive gear 142 is fixed to input shaft 132 which may be coupled to an engine of a snowmobile, for example, by a continuously variable transmission.

Figure 6:
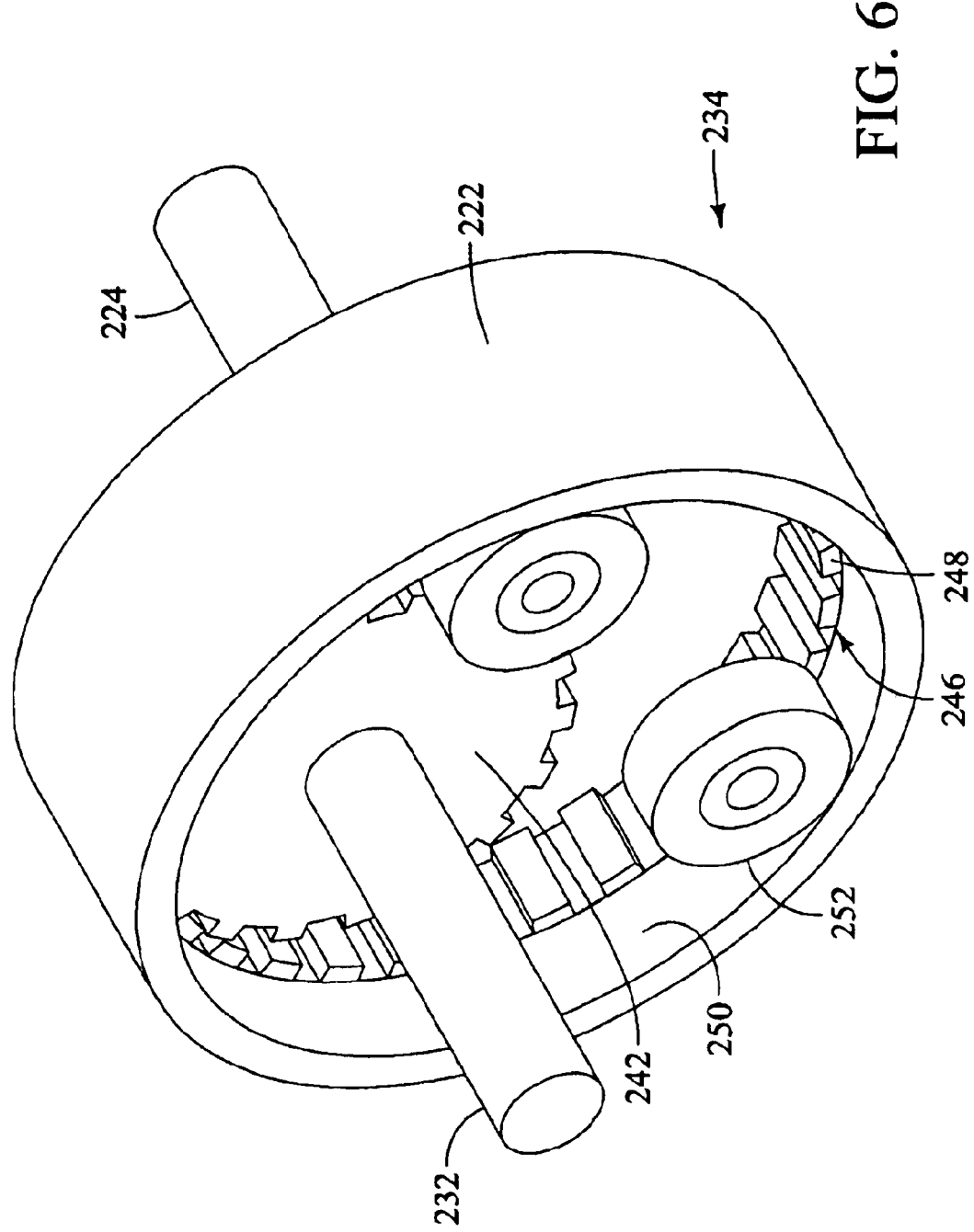
FIG. 6 is a perspective view of a speed reduction mechanism in accordance with an additional exemplary embodiment of the present invention.

FIG. 6 is a perspective view of a speed reduction mechanism 234 in accordance with an additional exemplary embodiment of the present invention. In the embodiment of FIG. 6, speed reduction mechanism 234 comprises a ring gear 222 that is fixed to a drive shaft 224, and a drive gear 242 that is fixed to an input shaft 232. In the embodiment of FIG. 6, ring gear 222 includes a step 246 disposed between teeth 248 and a track surface 250. In the embodiment of FIG. 6, track surface 250 has a diameter that is similar to a root diameter of teeth 248 of ring gear 222.

In FIG. 6, two rollers 252 are shown disposed within cavity 240 of ring gear 222 in FIG. 6. In FIG. 6, it may be appreciated that rollers 252 are disposed proximate track surface 250. Rollers 252 may serve to support ring gear 222 by selectively contacting track surface 250. It is to be appreciated that embodiments of the present invention are possible which do not include rollers 252. It should also be appreciated that embodiments of the present invention are possible which include support elements other than rollers 252.

Figure 7:
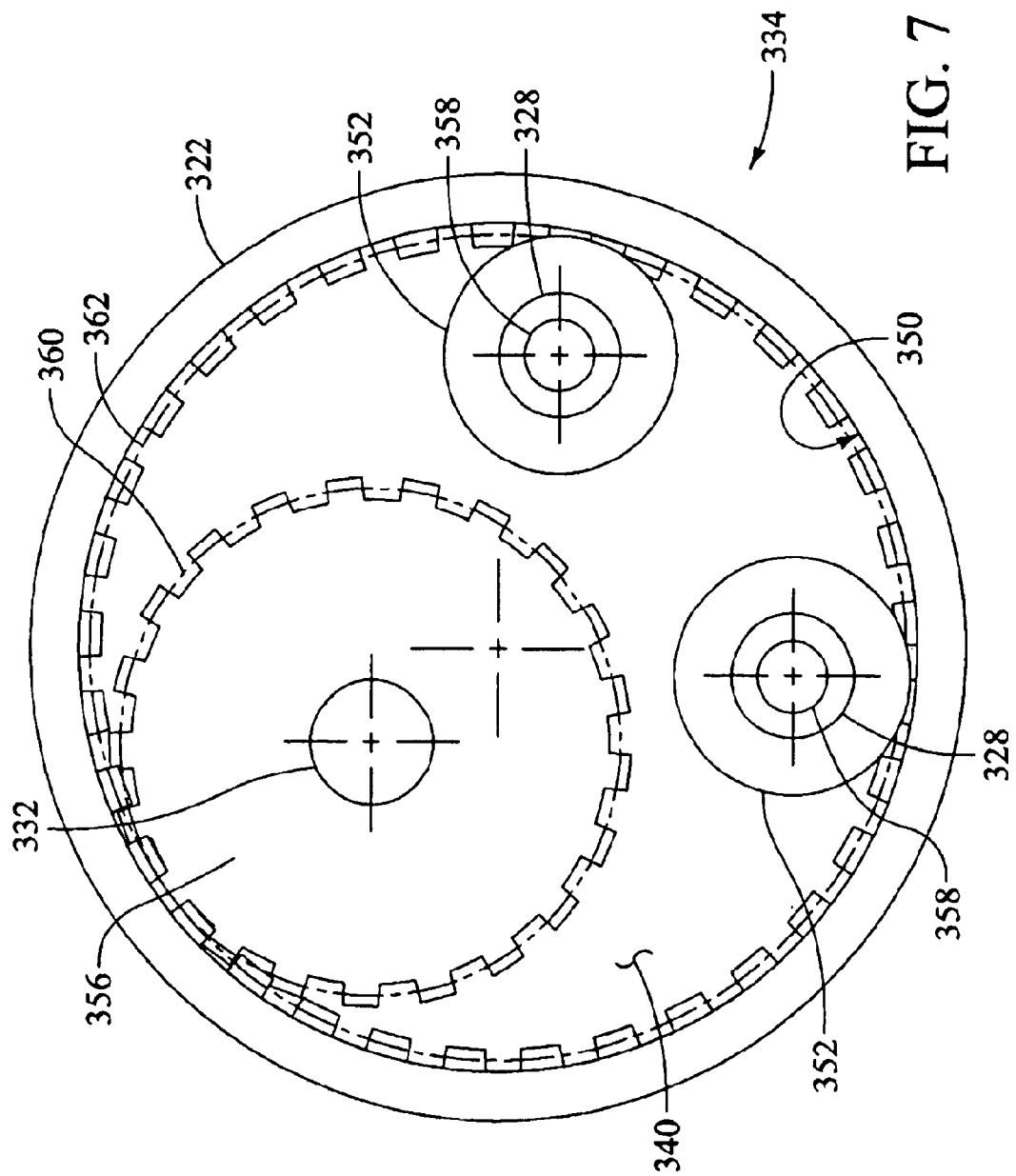
FIG. 7 is a plan view of a speed reduction mechanism in accordance with yet another exemplary embodiment of the present invention.

FIG. 7 is a plan view of a speed reduction mechanism 334 in accordance with yet another exemplary embodiment of the present invention. Speed reduction mechanism 334 includes a ring gear 322 and an input gear 356 each having a plurality of teeth. In FIG. 7, the teeth of ring gear 322 and input gear 356 are illustrated having a generally rectangular shape. It is to be appreciated that gears having various tooth shapes may be used without deviating from the spirit and scope of the present invention. Examples of gear tooth profiles which may be suitable in some applications include cycloidal and involute profiles.

Input gear 356 is preferably fixed to an input shaft 332. In a preferred embodiment of the present invention, input shaft 332 is rotatably supported by a mounting plate which also supports to a plurality of pins 358. In the embodiment of FIG. 7, each pin supports a roller 352 including a bearing 328.

A first pitch circle 360 of input gear 356 is illustrated in FIG. 7 with a dashed line. Likewise, a second pitch circle 362 of ring gear 322 is also illustrated with a dashed line in FIG. 7. In FIG. 7, it may be appreciated that first pitch circle 360 of input gear 356 has a diameter that is different than the diameter of second pitch circle 362 of ring gear 322. In a preferred embodiment, the diameters of first pitch circle 360 and second pitch circle 362 may be selected to provide a desired gear ratio.

In FIG. 7, rollers 352 are shown disposed within a cavity 340 defined by ring gear 322. In FIG. 7, it may be appreciated that rollers 352 are disposed proximate a track surface 350 of ring gear 322. Rollers 352 may serve to support ring gear 322 by selectively contacting track surface 350.

Figure 8:
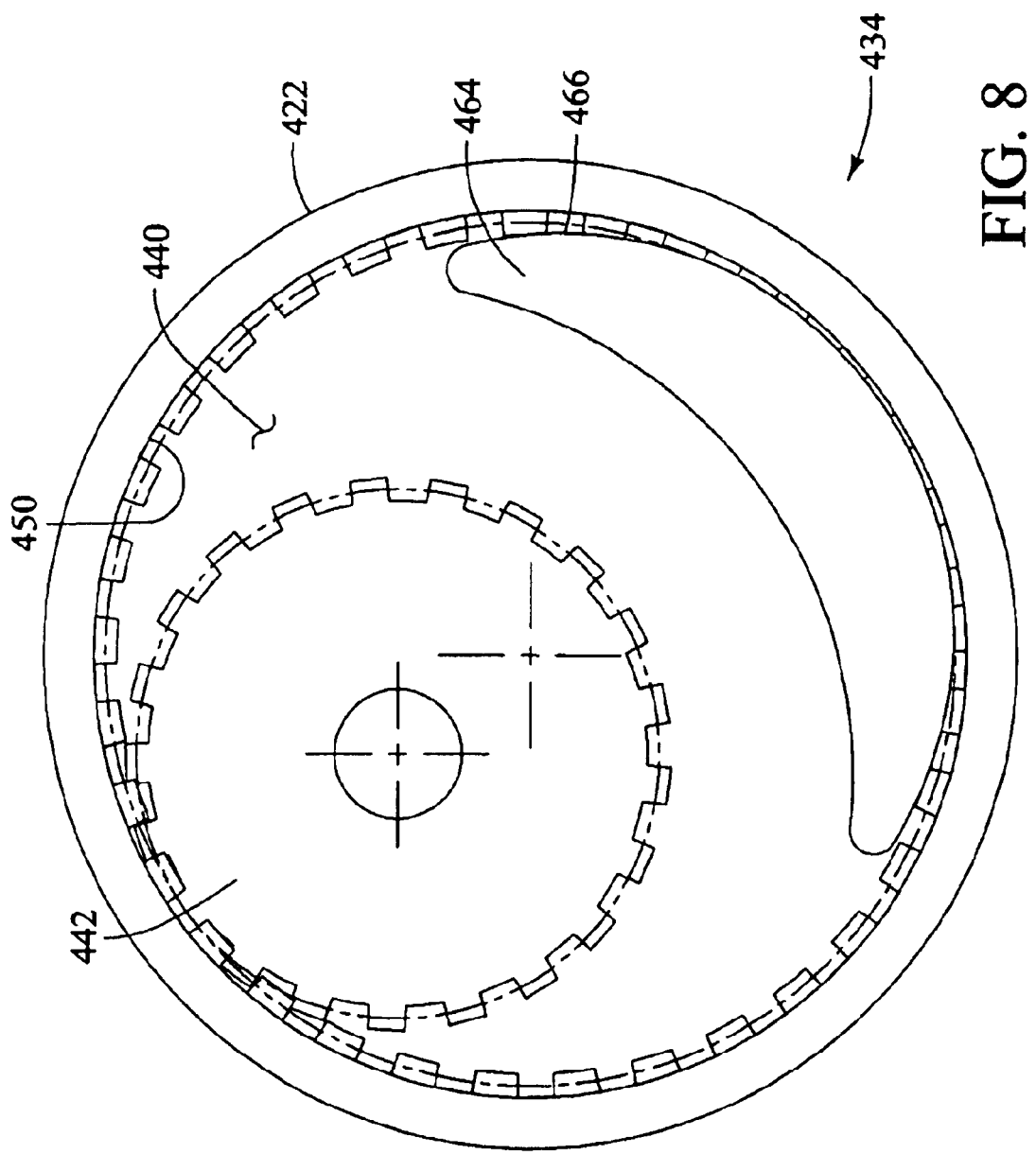
FIG. 8 is a plan view of a speed reduction mechanism in accordance with an additional exemplary embodiment of the present invention.

FIG. 8 is a plan view of a speed reduction mechanism 434 in accordance with an additional exemplary embodiment of the present invention. Speed reduction mechanism 434 includes a ring gear 422 defining a cavity 440. A input gear 442 is disposed within cavity 440. A support member 464 is also disposed within cavity 440. In a preferred embodiment, support member 464 includes a sliding contact surface 466 having a shape similar to a track surface 450 of ring gear 422. Also in the embodiment of FIG. 8, sliding contact surface 466 and track surface 450 of ring gear 422 define a gap. In some embodiments of the present invention, there may be a gap between the track surface of the ring gear and sliding contact surface 466 so that the surfaces contact one another intermittently, for example, when the drive shaft is subjected to extreme loads. In some embodiments of the present invention, support member 464 is supported by a mounting plate that is selectively fixed to a housing.

Figure 9:
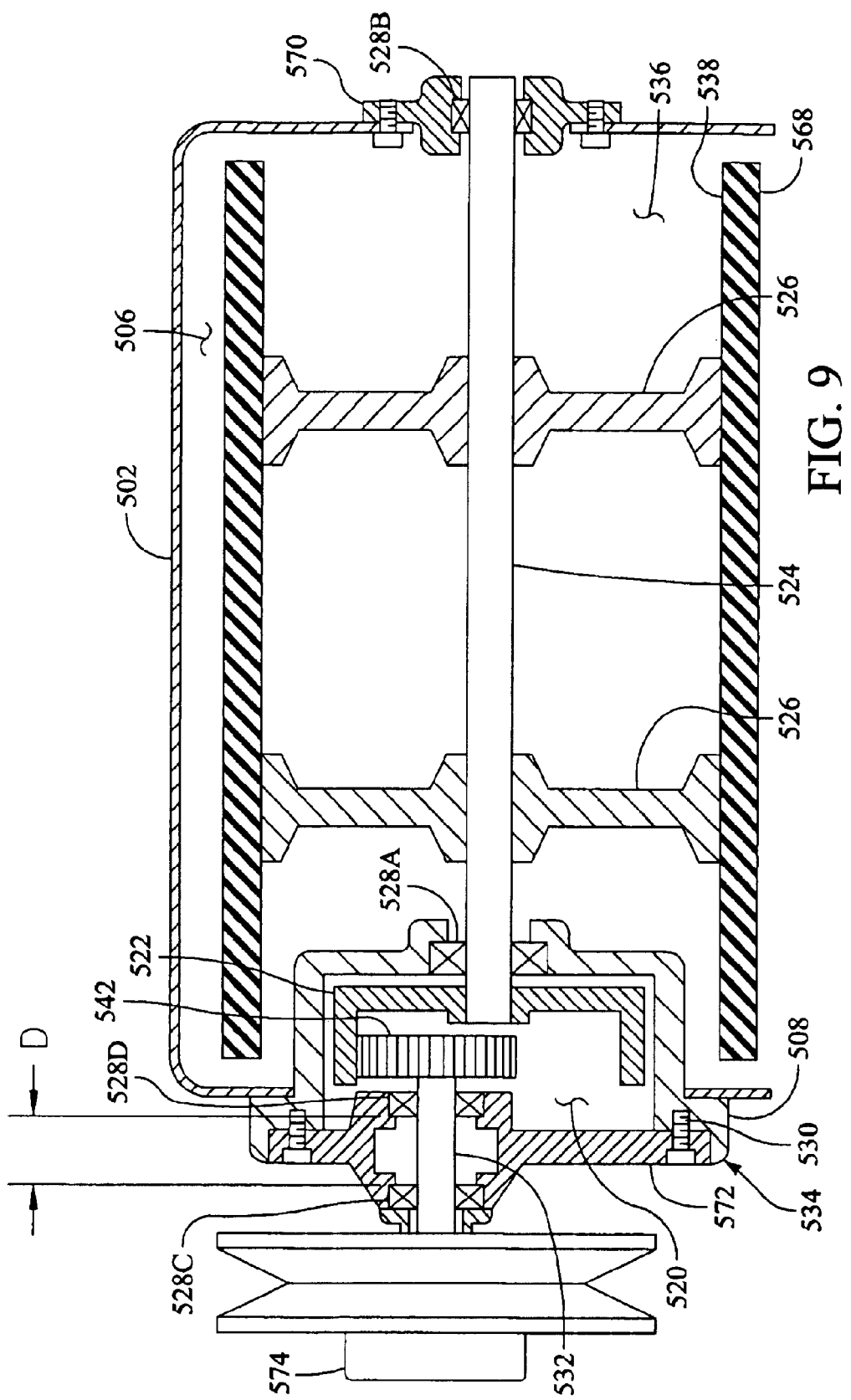
FIG. 9 is a cross sectional view of an assembly in accordance with an exemplary embodiment of the present invention.

FIG. 9 is a cross sectional view of an assembly in accordance with an exemplary embodiment of the present invention. The assembly of FIG. 9 includes a chassis 502 defining a tunnel 506. A drive shaft 524 is disposed within tunnel 506, and rotatably supported by chassis 502. A plurality of drive sprockets 526 are fixed to drive shaft 524. A track 568 is disposed at least partially within tunnel 506. In FIG. 9, track 568 is shown overlaying a portion of drive sprockets 526.

An inner surface 538 of track 568 defines an interior 536. In the embodiment of FIG. 9, drive shaft 524 is rotatably supported by a first bearing 528A that is disposed within interior 536 of track 568. In FIG. 9, it may be appreciated that first bearing 528A is supported by a housing 508 that is fixed to chassis 502. Also in FIG. 9, it may be appreciated that housing 508 extends into tunnel 506 of chassis 502 and interior 536 of track 568.

Drive shaft 524 is also rotatably supported by a second bearing 528B. In the embodiment of FIG. 9, second bearing 528B is supported by a support 570 that is preferably selectively fixed to chassis 502. Embodiments of the present invention are possible in which second bearing 528B is disposed within interior 536 of track 568. Embodiments of the present invention are also possible in which drive track 504 has a width greater than a length of drive shaft 524.

The assembly of FIG. 9 also includes a speed reduction mechanism 534 comprising a plurality of gears that are substantially disposed within a chamber 520 defined by housing 508. In the embodiment of FIG. 9, speed reduction mechanism 534 comprises a ring gear 522 that is fixed to drive shaft 524, and a input gear 542 that is fixed to an input shaft 532. In the embodiment of FIG. 9, input shaft 532 is rotatably supported by a mounting plate 572. As shown in FIG. 9, mounting plate 572 supports a third bearing 528C and a fourth bearing 528D.

Various embodiments of mounting plate 572 are possible without deviating from the spirit and scope of the present invention. For example, embodiments of mounting plate 572 are possible which include a single bearing. In the embodiment of FIG. 9, mounting plate 572 includes two bearings that are separated by a distance D. In some embodiments, distance D may effectively be zero. In other words, the two bearings may be butted up against one another. In certain advantageous embodiments, the two bearings may be separated by a distance D which is greater than about zero. In certain particularly advantageous embodiments, the two bearings may be separated by a distance greater than about half the diameter of the input shaft. In these advantageous embodiments, separating third bearing 528C and fourth bearing 528D by a distance extending along the longitudinal axis of the input shaft 532 provides a high level of support for input shaft 532. This advantageous arrangement provides secure journaling of input shaft 532 by mounting plate 572. Thus, the likelihood that input shaft 532 will be free to wobble is significantly reduced.

In the embodiment of FIG. 9, mounting plate 572 is selectively fixed to housing 508 by a plurality of threaded fasteners 530. Housing 508 is preferably selectively fixed to chassis 502, for example, with a plurality of threaded fasteners. Embodiments of the present invention are also possible in which mounting plate 572 is directly fixed to chassis 502. In FIG. 9, it may be appreciated that a driven pulley 574 is fixed to input shaft 532 proximate one end thereof. Driven pulley 574 may form part of a continuously variable transmission.

Figure 10:
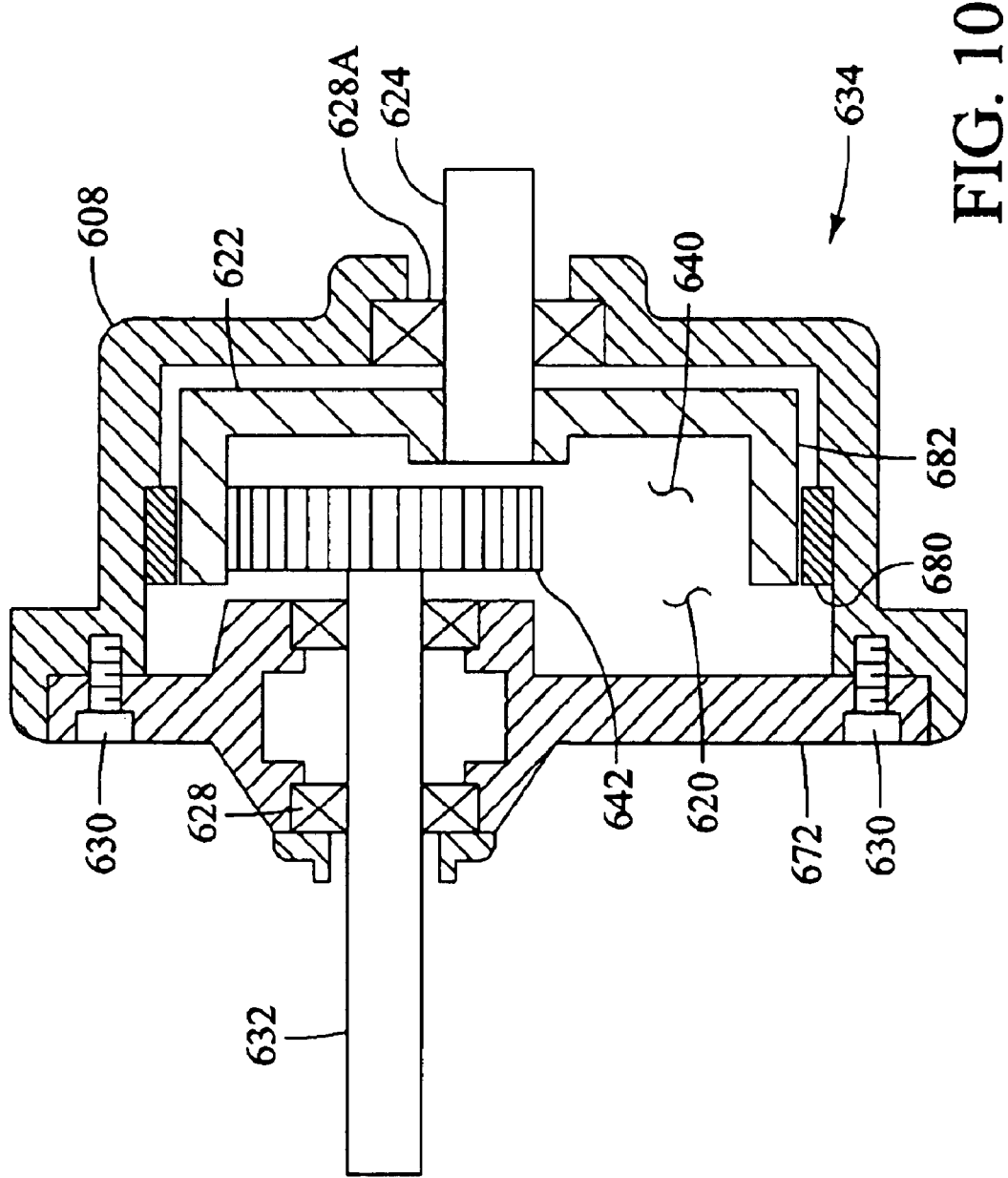
FIG. 10 is a cross-sectional view of a speed reduction mechanism in accordance with an additional exemplary embodiment of the present invention.

FIG. 10 is a cross-sectional view of a speed reduction mechanism 634 in accordance with an additional exemplary embodiment of the present invention. Speed reduction mechanism 634 includes a ring gear 622 defining a cavity 640. Speed reduction mechanism 634 also includes a input gear 642 which is disposed in cavity 640 defined by ring gear 622.

In FIG. 10, it may be appreciated that input gear 642 is fixed to an input shaft 632 which extends through a mounting plate 672. As shown in FIG. 10, mounting plate 672 supports a plurality of bearings 628 for rotatably supporting input shaft 632. In FIG. 10, it may be appreciated that ring gear 622 is fixed to a drive shaft 624. Drive shaft 624 is rotatably supported by a first bearing 628A. First bearing 628A is supported by a housing 608. In the embodiment of FIG. 10, mounting plate 672 is fixed to housing 608 by a plurality of fasteners 630. In FIG. 10, it may be appreciated that housing 608 and mount plate 678 define a chamber 620. In FIG. 10, it may also be appreciated that ring gear 622 and input gear 642 are disposed in chamber 620.

In the embodiment of FIG. 10, speed reduction mechanism 634 includes a support ring 680 which is disposed within chamber 620 defined by housing 608. Support ring 680 may be fixed to housing 608, for example, by press fitting support ring 680 into chamber 620. In the embodiment of FIG. 10, a small gap exits between an inner surface of support ring 680 and outer surface 682 of ring gear 622. In a preferred embodiment, this gap is dimensioned so that outer surface 682 of ring gear 622 can contact support ring 680 when drive shaft 624 is subjected to extreme loads.

Support ring 680 may comprise various materials without deviating from the spirit and scope of the present invention. Examples of materials which may be suitable in some applications include bronze, sintered bronze, and polytetrafluoroethylene (PTFE) coated steel.

Figure 11:
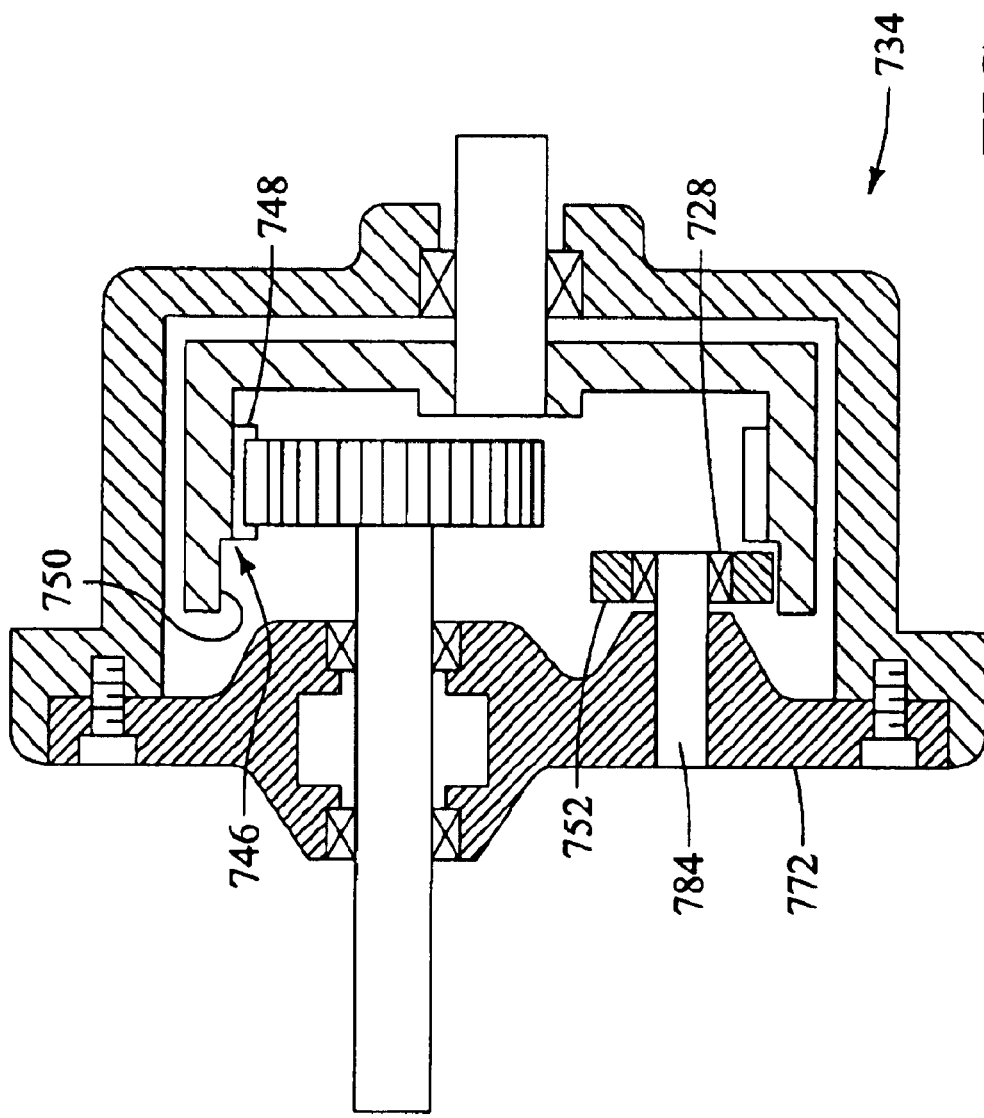
FIG. 11 is a cross-sectional view of a speed reduction mechanism in accordance with yet another exemplary embodiment of the present invention.

FIG. 11 is a cross-sectional view of a speed reduction mechanism 734 in accordance with yet another exemplary embodiment of the present invention. In the embodiment of figure 11, speed reduction mechanism 734 includes a ring gear 722 having a plurality of teeth 748. Ring gear 722 also includes a step 746 disposed between teeth 748 and a track surface 750. In the embodiment of FIG. 11, track surface 750 has a diameter that is slightly larger than a root diameter of teeth 748 of ring gear 722. In the embodiment of FIG. 11, speed reduction mechanism 734 includes a roller 752 that is disposed proximate track surface 750. Roller 752 is supported by a bearing 728 and a pin 784. Pin 784 is fixed to a mounting plate 772 for example using a friction fit. In figure 11, a small gap is shown between track surface 750 of ring gear 722 and the outer surface of roller 752. In a preferred embodiment, this gap is dimensioned so that track surface 750 of ring gear 722 can contact roller 752 when drive shaft 724 is subjected to extreme loads.

Figure 12:
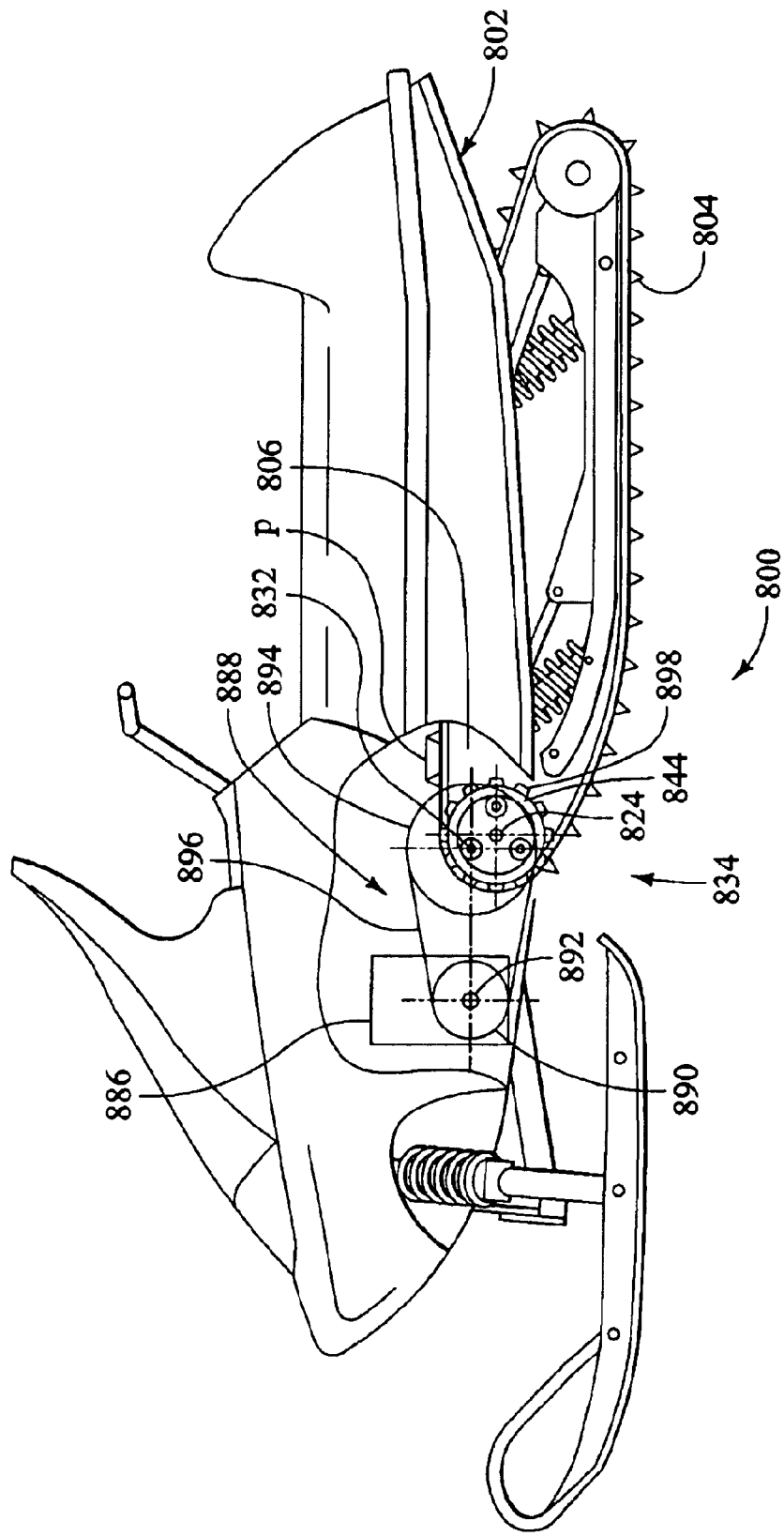
FIG. 12 is a plan side view of a snowmobile in accordance with an exemplary embodiment of the present invention.

FIG. 12 is a plan side view of a snowmobile 800 in accordance with an exemplary embodiment of the present invention. Snowmobile 800 includes a drive track 804 which may be used to propel snowmobile 800. An engine 886 of snowmobile 800 is operatively coupled to drive track 804 by a drivetrain 888 of snowmobile 800.

In the embodiment of FIG. 12, drivetrain 888 includes a drive clutch 890 that is coupled to a crankshaft 892 of engine 886. Drive clutch 890 is coupled to a driven clutch 894 by a belt 896. Driven clutch 894 is fixed to an input shaft 832 of a speed reduction mechanism 834. Speed reduction mechanism 834 is coupled to a drive shaft assembly including a drive shaft 824 and a drive sprocket 844 having a plurality of protrusions 898 that are adapted to mate with drive track 804. In a preferred embodiment, speed reduction mechanism 834 is disposed within a tunnel 806 defined by a chassis 802 of snowmobile 800. In FIG. 12 it may be appreciated that the axis of rotation of driven clutch 894 and input shaft 832 is located above and forward of the axis of rotation of drive shaft 824. It is to be appreciated that other embodiments are possible without deviating from the spirit and scope of the present invention. In some embodiments, for example, the axis of rotation of driven clutch 894 and input shaft 832 may be located directly above the axis of rotation of drive shaft 824. In other embodiments, for example, the axis of rotation of driven clutch 894 and input shaft 832 may be located directly above and rearward of the axis of rotation of drive shaft 824.

In FIG. 12, it may be appreciated that speed reduction mechanism 834 is disposed below a reference plane P defined by an outer surface of drive track 804. Placing speed reduction mechanism 834 in a relatively low position may serve to lower the center of gravity.of a snowmobile 800. A snowmobile with a lower center of gravity may be more stable and is less likely to overturn.

Figure 13:
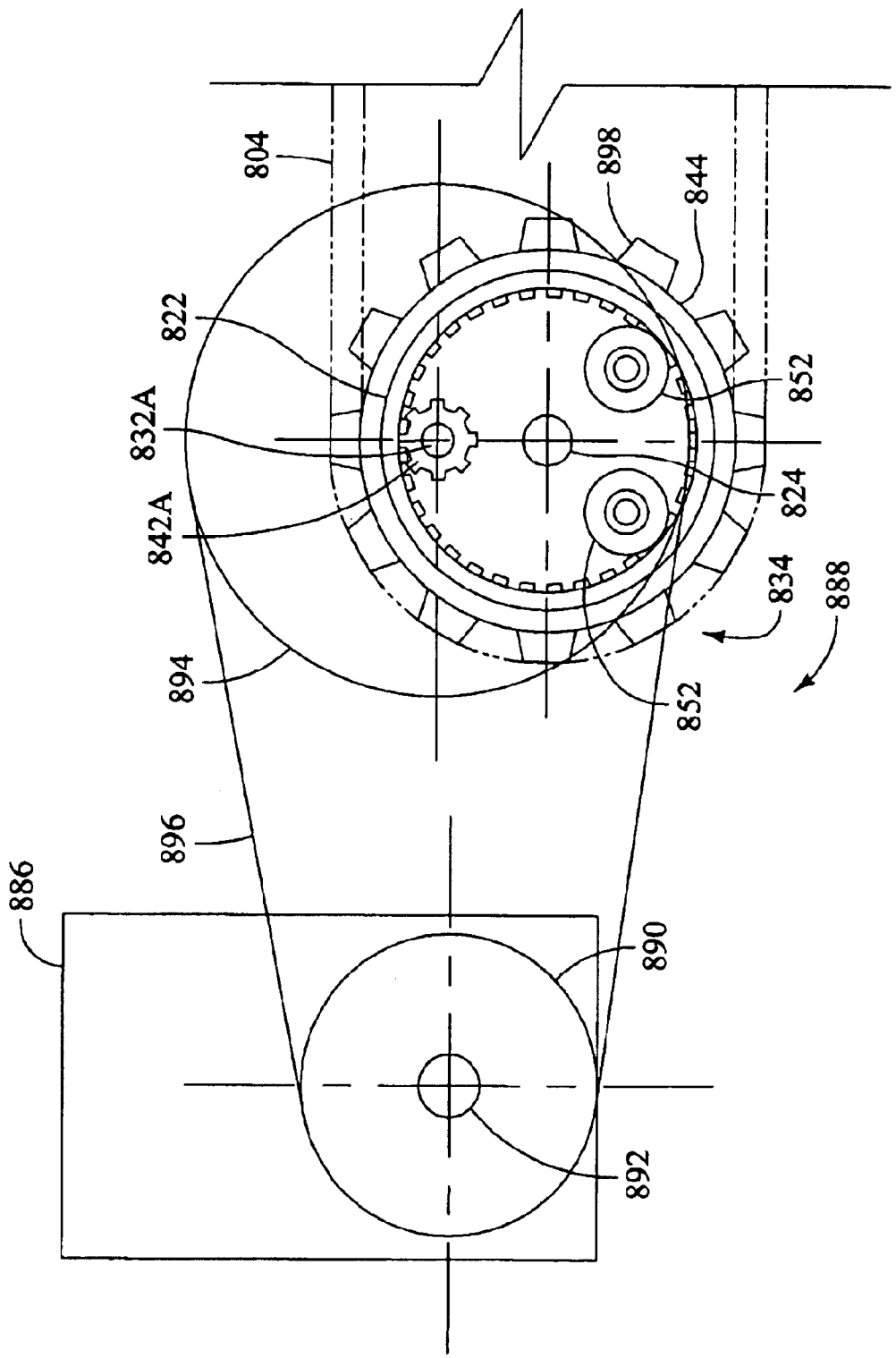
FIG. 13 is a diagrammatic view of a drivetrain in accordance with an exemplary embodiment of the present invention.

FIG. 13 is a diagrammatic view of a drivetrain 888 in accordance with an exemplary embodiment of the present invention. Drivetrain 888 may be used to operatively couple an engine 886 to a drive track 804. In FIG. 13, drive track 804 is illustrated using phantom lines. Drivetrain 888 includes a drive sprocket 844 having a plurality of protrusions 898 that are adapted to mate with drive track 804. Drive sprocket 844 is fixed to a drive shaft 824. A ring gear 822 is also fixed to drive shaft 824. Ring gear 822 forms part of a speed reduction mechanism 834. Speed reduction mechanism 834 also includes a first drive gear 842A and a plurality of rollers 852. First drive gear 842A is fixed to a first input shaft 832A of speed reduction mechanism 834. A driven clutch 894 is also fixed to first input shaft 832A. A belt 896 extends between driven clutch 894 and a drive clutch 890. Drive clutch 890 is fixed to a crankshaft 892 of engine 886. In FIG. 13 it may be appreciated that the axis of rotation of driven clutch 894 and input shaft 832A is located above the axis of rotation of drive shaft 824 providing an elevated position for driven clutch 894.

Figure 14:
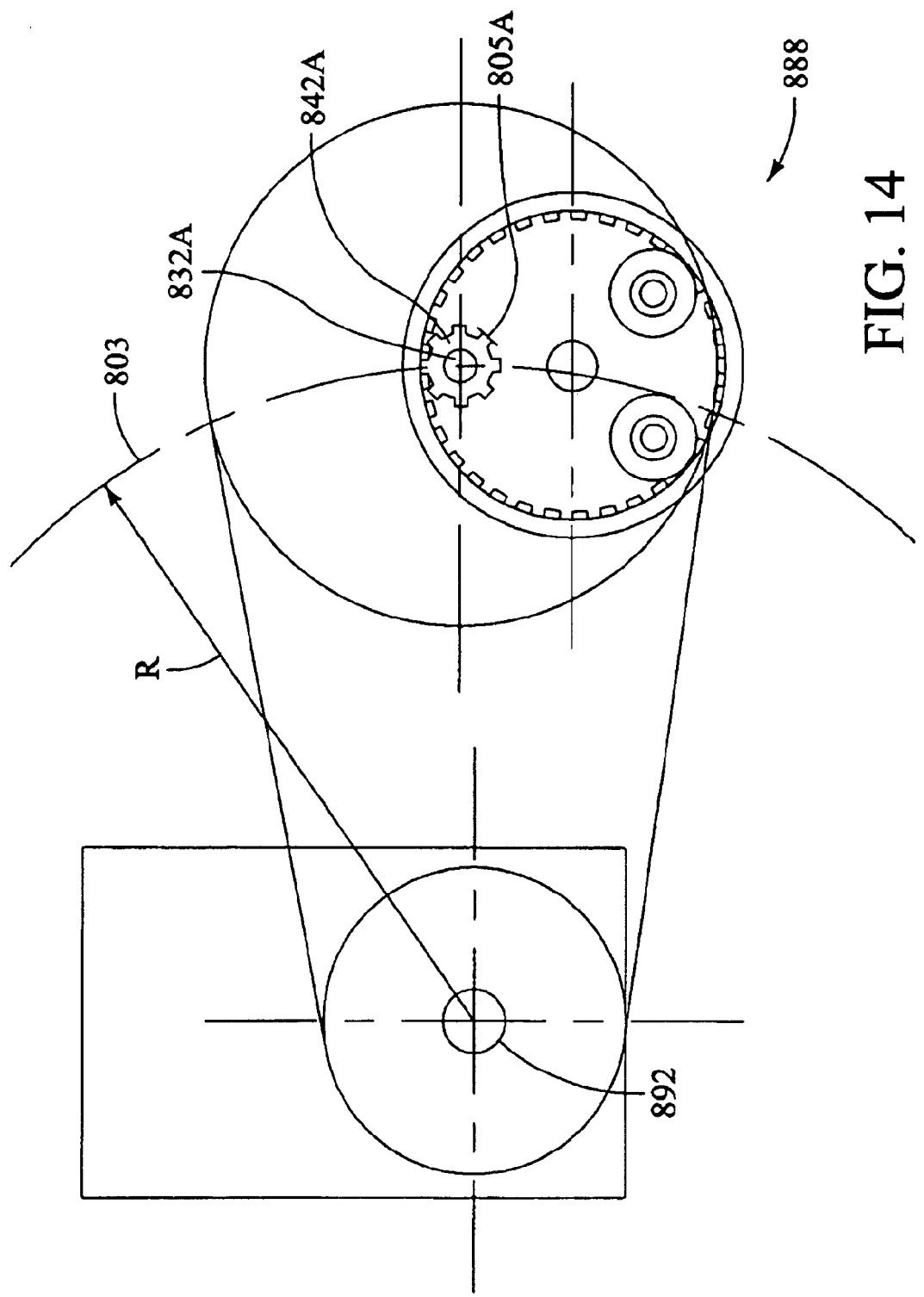
FIG. 14 is an additional diagrammatic view of drivetrain of FIG. 13.

FIG. 14 is an additional diagrammatic view of drivetrain 888 of the previous figure. In FIG. 14 it may be appreciated that the center of first input shaft 832A lies on a radius line 803 that is disposed at a radius R from crankshaft 892. In FIG. 14 it may also be appreciated that first drive gear 842A has a first diameter 805A.

Figure 15:
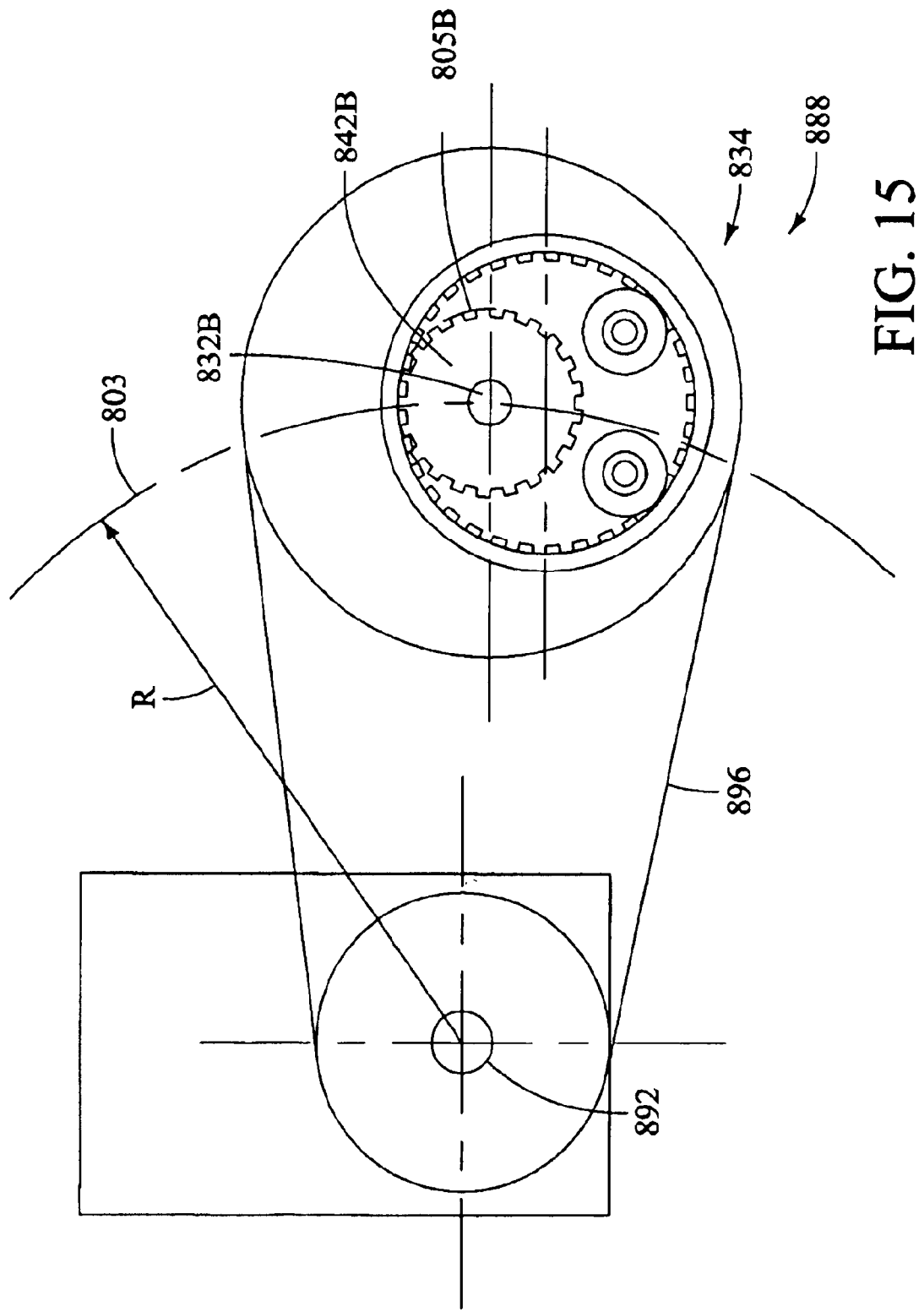
FIG. 15 is yet another diagrammatic view of drivetrain of FIG. 13.

FIG. 15 is yet another diagrammatic view of drivetrain 888 of FIG. 13. In the embodiment of FIG. 15, first drive gear 842A has been replaced with a second drive gear 842B. In FIG. 15, it may be appreciated that second drive gear 842B has a second diameter 805B. In a preferred embodiment, second diameter 805B of second drive gear 842B is different from first diameter 805A of first drive gear 842A. In this preferred embodiment, a gear ratio of speed reduction mechanism 834 may be changed by replacing first drive gear 842A with second drive gear 842B.

Second drive gear 842B is coupled to a second input shaft 832B. In FIG. 15, it may be appreciated that the center of second input shaft 832B lies on radius line 803. In a preferred embodiment of the present invention, the same drive belt 896 can be used in the embodiment of FIG. 15 and the embodiment of FIG. 14, since in both cases, the input shaft lies a distance R from crankshaft 892.

A method of changing a gear ratio of a drivetrain in accordance with the present invention may comprise the steps of 1) providing a speed reduction mechanism including a ring gear fixed to a drive shaft, 2) providing an original assembly fixed to the speed reduction mechanism, the original assembly including an original drive gear rotatably supported by an original mounting plate, 3) providing a new assembly including a new drive gear rotatably supported by a new mounting plate, the new drive gear having an effective diameter different than an effective diameter of the original drive gear, 4) removing the original assembly from the speed reduction mechanism, and 5) installing the new assembly onto the speed reduction mechanism.

Figure 16:
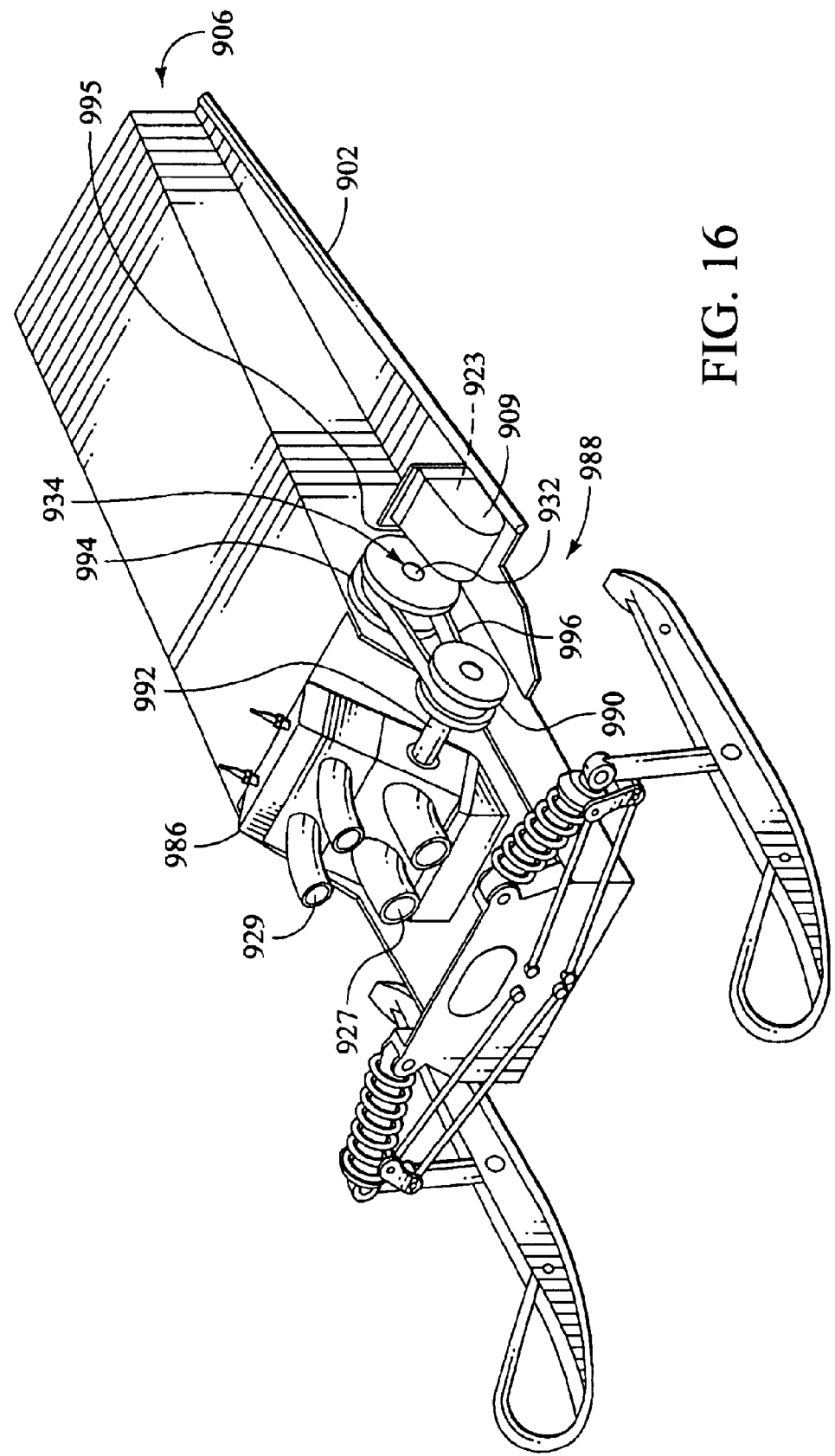
FIG. 16 is a perspective view of a snowmobile chassis assembly in accordance with an exemplary embodiment of the present invention.

FIG. 16 is a perspective view of a snowmobile chassis assembly in accordance with an exemplary embodiment of the present invention. The assembly of FIG. 16 includes an engine 986 that is coupled to a chassis 902 defining a tunnel 906. Engine 986 is preferably coupled to a drive track by a drivetrain 988 for propelling a snowmobile in accordance with the present invention. In FIG. 16 it may be appreciated that drivetrain 988 includes a drive clutch 990 that is coupled to a crankshaft 992 of engine 986. Drive clutch 990 is coupled to a driven clutch 994 by a belt 996. Driven clutch 994 is fixed to an input shaft 932 of a speed reduction mechanism 934.

The assembly of FIG. 16 also includes a cage 909 that is fixed to chassis 902. Cage 909 defines a foot well 923 which is preferably dimensioned to receive the foot of a rider. In FIG. 16 it may be appreciated that cage 909 is disposed proximate driven clutch 994. Cage 909 of FIG. 16 includes a wall 925 which is disposed between foot well 923 and driven clutch 994.

Engine 986 of FIG. 16 includes a plurality of input ports 927. Air entering engine 986 may flow through input ports 927. Exhaust gases may exit engine 986 via a plurality of exhaust ports 929. In the embodiment of FIG. 16, input ports 927 and exhaust ports 929 are both disposed on the same side of a plane defined by the cylinder bore axes of engine 986. In FIG. 16 it may be appreciated that engine 986 is generally disposed at an angle relative to vertical so that the cylinder bore axes of engine 986 extend generally upwardly and rearwardly.

Figure 17:
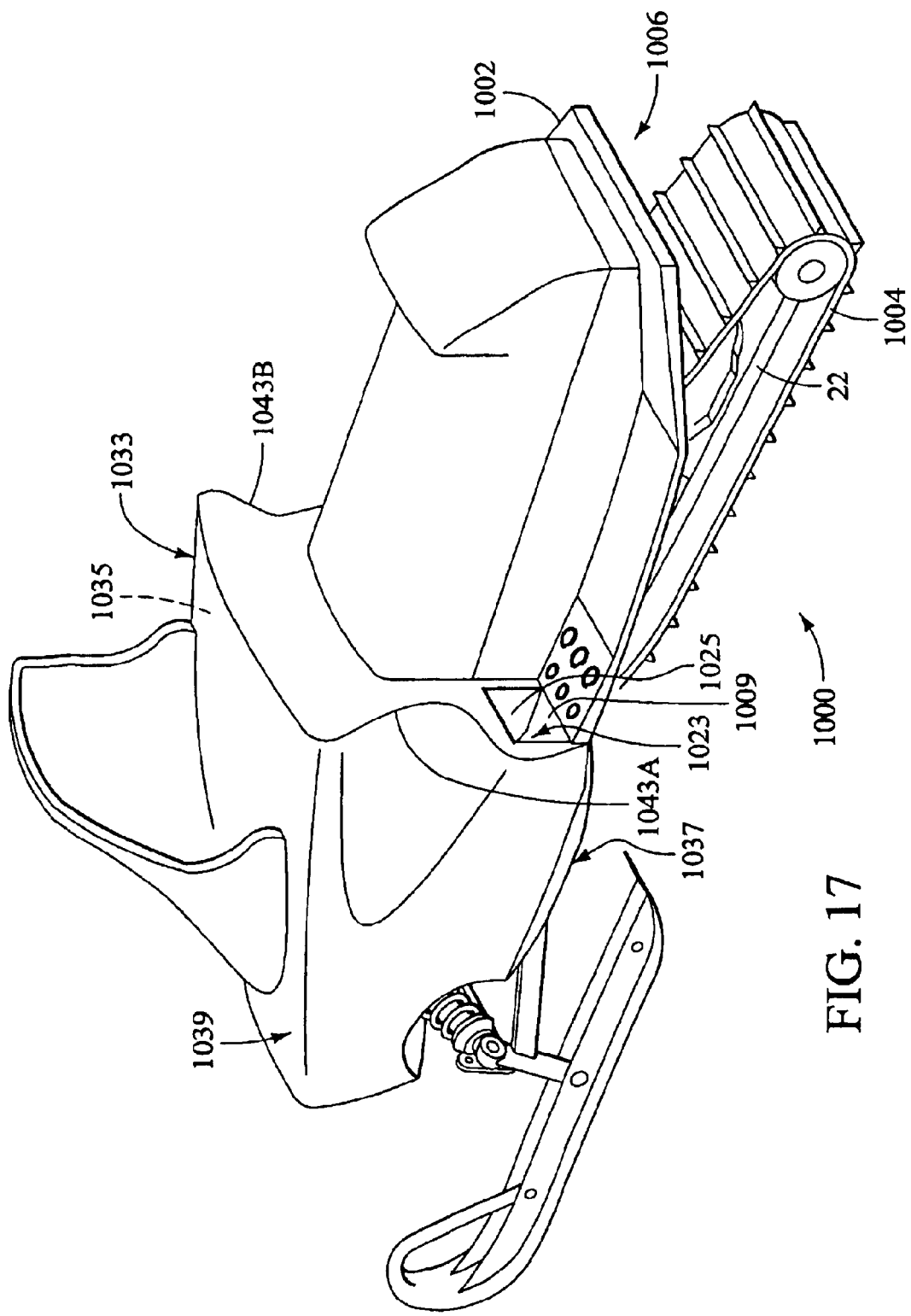
FIG. 17 is a perspective view of a snowmobile in accordance with an additional exemplary embodiment of the present invention.

FIG. 17 is a perspective view of a snowmobile 1000 in accordance with an additional exemplary embodiment of the present invention. Snowmobile 1000 has a chassis 1002 defining a tunnel 1006. In the embodiment of FIG. 17, a drive track 1004 can be seen extending from tunnel 1006. In the embodiment of FIG. 17, drive track 1004 comprises an endless loop that is supported by a rear suspension 22. In a preferred embodiment, drive track 1004 is operatively coupled to an engine by a drivetrain so that drive track 1004 may be used to propel snowmobile 1000. In some embodiments, the drivetrain of snowmobile 1000 includes a driven clutch that is coupled to a drive clutch by a belt.

In FIG. 17, it may be appreciated that snowmobile 1000 includes a foot well 1023 that is defined by a cage 1009. Cage 1009 of FIG. 17 includes a wall 1025. In a preferred embodiment, wall 1025 of cage 1009 is disposed between foot well 1023 and a driven clutch of snowmobile 1000. Also in a preferred embodiment, cage 1009 is selectively fixed to snowmobile 1000 so that it can be removed, for example, when performing maintenance on snowmobile 1000.

Snowmobile 1000 of FIG. 17 also includes a cowling 1033 defining an engine compartment 1035. In the embodiment of FIG. 17, cowling 1033 includes a pan portion 1037 and a hood portion 1039. In FIG. 17, it may be appreciated that foot well 1023 defined by cage 1009 extends into the engine compartment 1035 defined by cowling 1033. In a preferred embodiment, foot well 1023 is dimensioned to receive a foot of a rider. Also in the embodiment of FIG. 17, cowling 1033 defines a first notch 1043A and a second notch 1043B. In a preferred embodiment, first notch 1043A and second notch 1043B are dimensioned to receive the knees of the rider. In FIG. 17, it may be appreciated that first notch 1043A is generally disposed above foot well 1023. In some embodiments, first notch 1043A is disposed above a driven clutch of snowmobile 1000. In some embodiments, snowmobile 1000 may include a second foot well located below second notch 104313.

Figure 18:
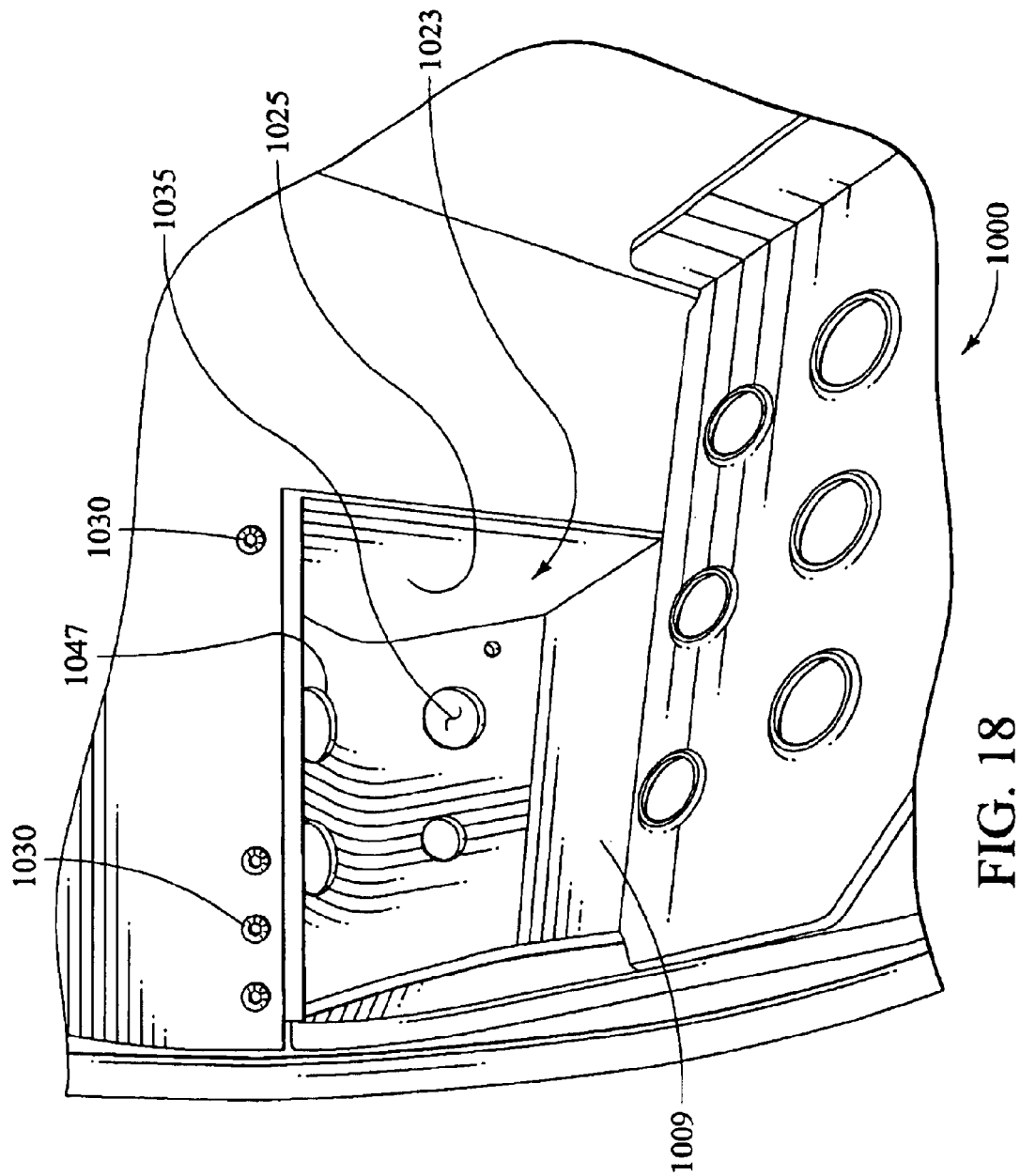
FIG. 18 is an enlarged perspective view illustrating a portion of snowmobile of the previous figure.

FIG. 18 is an enlarged perspective view illustrating a portion of snowmobile 1000 of the previous figure. In FIG.

18, it may be appreciated that cage 1009 is selectively fixed to snowmobile 1000 by a plurality of threaded fasteners 1030. In FIG. 18, wall 1025 of cage 1009 is shown extending at an angle relative to a longitudinal axis of snowmobile 1000. Cage 1009 of FIG. 18 includes a plurality of through holes 1047 which are in fluid communication with both foot well 1023 and engine compartment 1035 of snowmobile, 000.

Figure 19:
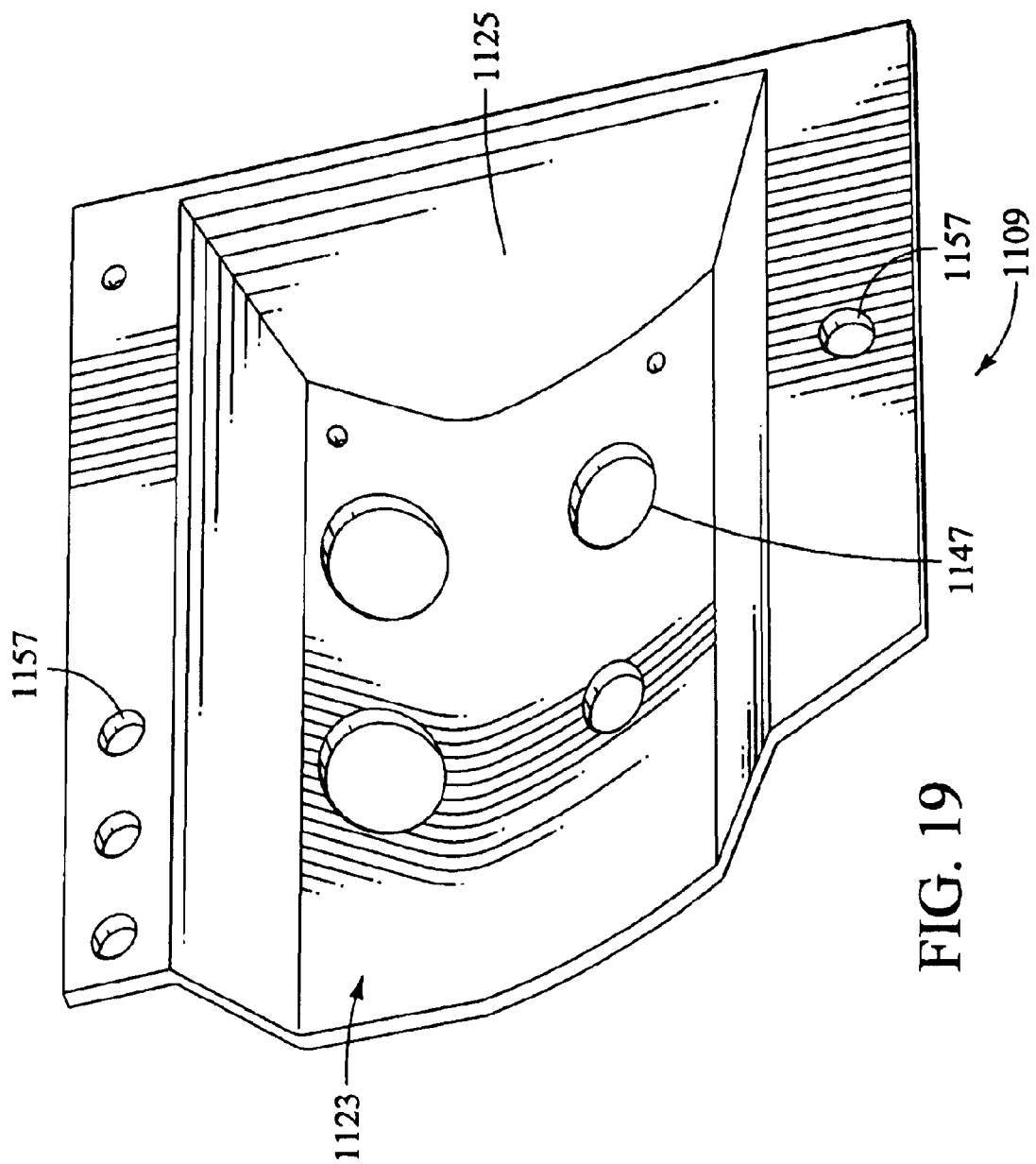
FIG. 19 is a perspective view of a cage in accordance with an exemplary embodiment of the present invention.

FIG. 19 is a perspective view of a cage 1109 in accordance with an exemplary embodiment of the present invention. Cage 1109 includes a wall 1125 which partially defines a foot well 1123. In the embodiment of FIG. 19, cage 1109 includes a plurality of mounting holes 1157 and a plurality of through holes 1147.

Figure 20:
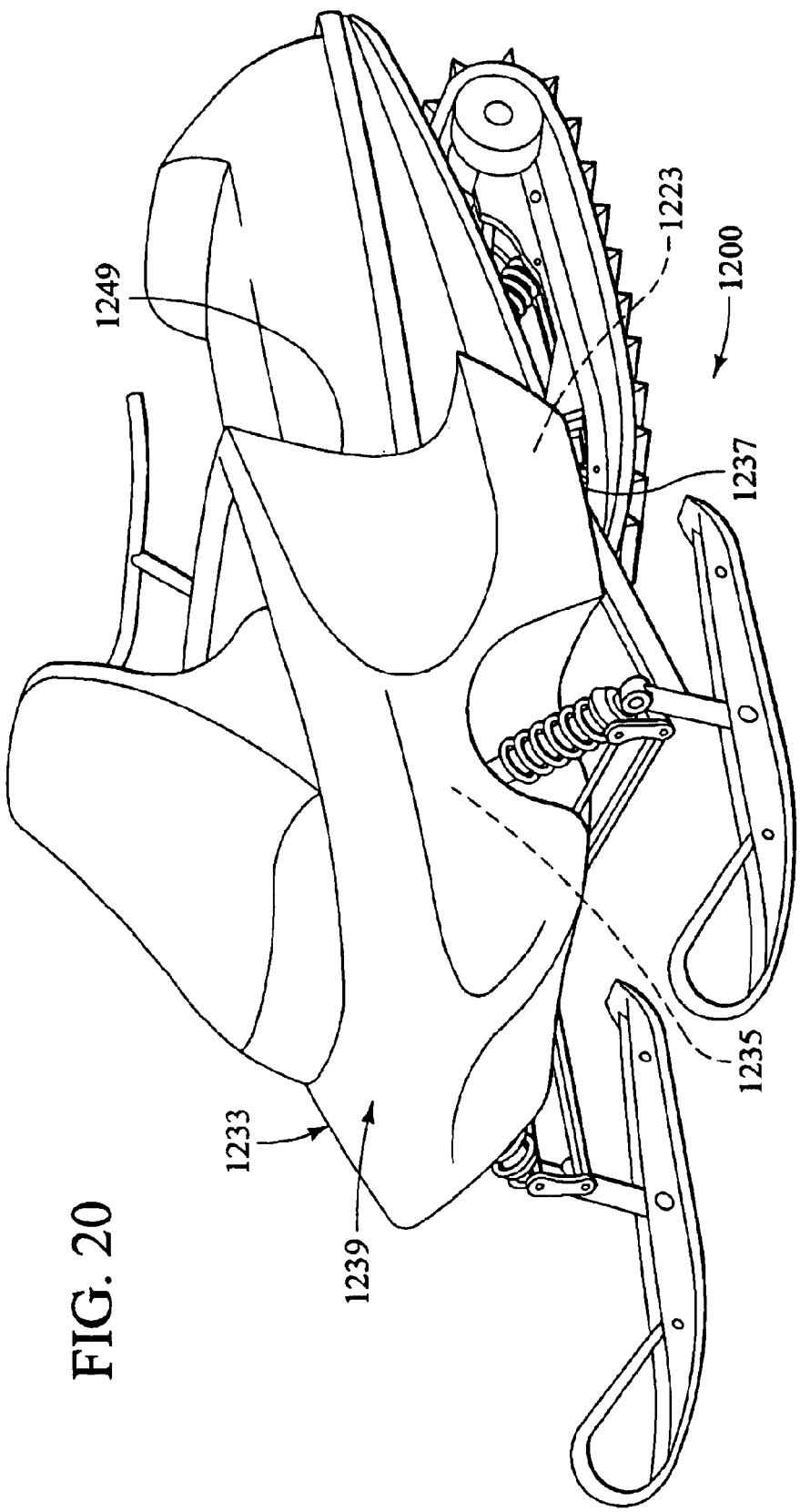
FIG. 20 is a perspective view of a snowmobile in accordance with yet another exemplary embodiment of the present invention.

FIG. 20 is a perspective view of a snowmobile 1200 in accordance with yet another exemplary embodiment of the present invention. Snowmobile 1200 of FIG. 20 includes a cowling 1233 defining an engine compartment 1235. In the embodiment of FIG. 20, cowling 1233 includes a pan portion 1237 and a hood portion 1239. In FIG. 20, it may be appreciated that cowling 1233 defines a foot well 1223. In a preferred embodiment, foot well 1223 is dimensioned to receive a foot of a rider. Also in the embodiment of FIG. 20, cowling 1233 defines a notch 1249. In a preferred embodiment, notch 1249 is dimensioned to receive the knee of the rider. In FIG. 20, it may be appreciated that notch 1249 is generally disposed above foot well 1223. In some embodiments, notch 1249 is disposed above a driven clutch of snowmobile 1200.

Several forms of invention have been shown and described, and other forms will now be apparent to those skilled in art. It will be understood that embodiments shown in drawings and described above are merely for illustrative purposes, and are not intended to limit the scope of invention defined claims which follow.

What is claimed is:

1. A snowmobile for transporting a rider, comprising:
   a chassis defining a tunnel;
   a drive shaft at least partially disposed in the tunnel;
   at least one drive sprocket fixed to the drive shaft;
   a drive track overlaying a portion of the at least one drive sprocket; and
   a bearing disposed completely within an interior of the drive track for rotatably supporting the drive shaft.

2. The snowmobile of claim 1, wherein the bearing is supported by a housing having a first portion fixed to the chassis and a second portion extending into the interior of the drive track.

3. The snowmobile of claim 2, wherein the housing is selectively fixed to the chassis by a plurality of threaded fasteners.

4. The snowmobile of claim 1, further including a first gear fixed to the drive shaft.

5. The snowmobile of claim 4, further including a second gear engaging the first gear so that a plurality of teeth of the second gear are intermeshed with a plurality of teeth of the first gear.

6. The snowmobile of claim 5, wherein the first gear has a first pitch circle and the second gear has a second pitch circle different from the first pitch circle.

7. The snowmobile of claim 6, wherein the first pitch circle and the second pitch circle are selected to provide a desired gear ratio.

8. The snowmobile of claim 6, wherein the first gear comprises a ring gear and the second gear comprises a spur gear disposed within a cavity defined by the ring gear.

9. The snowmobile of claim 1, further including:
   a cage fixed to the chassis; and
   the cage defining a foot well dimensioned to receive a foot of the rider.

10. The snowmobile of claim 9, further including:
    a driven clutch coupled to the drive shaft by a speed reduction mechanism; the cage being disposed proximate the driven clutch; and
    a wall of the cage being disposed between the foot well and the driven clutch.

11. A snowmobile for transporting a rider, comprising
    a chassis defining a tunnel;
    a drive shaft rotatably supported by the chassis;
    a drivetrain for operatively coupling the drive shaft to an engine; and
    the drivetrain comprising a speed reduction mechanism that is at least partially disposed within an interior of a drive track of the snowmobile.

12. The snowmobile of claim 11, wherein the speed reduction mechanism comprises a gear speed reduction mechanism.

13. The snowmobile of claim 12, wherein the gear reduction includes a ring gear fixed to the drive shaft and a spur gear disposed within a cavity defined by the ring gear.

14. The snowmobile of claim 11, wherein the drivetrain further includes a driven clutch fixed to an input shaft of the speed reduction mechanism.

15. The snowmobile of claim 11, wherein the drivetrain further includes a drive clutch fixed to a crankshaft of the engine and a drive belt extending between the drive clutch and the driven clutch.

16. The snowmobile of claim 11, further including a drive track encircling the drive shaft and a bearing disposed within an interior of the drive track for rotatably supporting the drive shaft.

17. The snowmobile of claim 16, wherein the bearing is supported by a housing having a first portion fixed to the chassis and a second portion extending into the interior of the drive track.

18. The snowmobile of claim 16, wherein the speed reduction mechanism is disposed within a chamber defined by a housing.

19. The snowmobile of claim 11, further including:
    a cage fixed to the chassis; and
    the cage defining a foot well dimensioned to receive a foot of the rider.

20. The snowmobile of claim 19, wherein the drivetrain includes a driven clutch;
    the cage being disposed proximate the driven clutch; and
    a wall of the cage being disposed between the foot well and the driven clutch.

* * * * *

UNITED STATES PATENT AND TRADEMARK OFFICE
CERTIFICATE OF CORRECTION

| | | |
|---|---|---|
| PATENT NO. | : 6,755,271 B1 | Page 1 of 1 |
| APPLICATION NO. | : 10/137970 | |
| DATED | : June 29, 2004 | |
| INVENTOR(S) | : Norman O. Berg | |

It is certified that error appears in the above-identified patent and that said Letters Patent is hereby corrected as shown below:

Title Page, line 3 item (*), delete "bydays days" and insert --by 11 days--.

Signed and Sealed this

Twenty-sixth Day of May, 2009

JOHN DOLL
*Acting Director of the United States Patent and Trademark Office*